US012663787B2

(12) United States Patent
Keerthisinghe et al.

(10) Patent No.: US 12,663,787 B2
(45) Date of Patent: Jun. 23, 2026

(54) SYSTEMS AND METHODS FOR RAMP PREDICTIONS FOR FORECASTING POWER USING NEIGHBORING SITES

(71) Applicant: Utopus Insights, Inc., Valhalla, NY (US)

(72) Inventors: Chanaka Keerthisinghe, Auckland (NZ); Ana Rita Reis Machado da Silva, Fradelos (PT); Paulino Tardaguila Calvo, Binissalem (ES); Thomas N. Theis, Croton on Hudson, NY (US); Gabor Horvath, Zalakaros (HU)

(73) Assignee: Utopus Insights, Inc., Valhalla, NY (US)

( * ) Notice: Subject to any disclaimer, the term of this patent is extended or adjusted under 35 U.S.C. 154(b) by 295 days.

(21) Appl. No.: 18/186,029

(22) Filed: Mar. 17, 2023

(65) Prior Publication Data

US 2023/0299580 A1 Sep. 21, 2023

Related U.S. Application Data

(60) Provisional application No. 63/488,629, filed on Mar. 6, 2023, provisional application No. 63/269,541, filed on Mar. 17, 2022.

(51) Int. Cl.
*G05B 23/02* (2006.01)
*G05B 15/02* (2006.01)
(Continued)

(52) U.S. Cl.
CPC ......... *G05B 23/0221* (2013.01); *G05B 15/02* (2013.01); *G06N 5/01* (2023.01);
(Continued)

(58) Field of Classification Search
CPC .......................... G05B 23/0221; G05B 15/02; G05B 2223/06; G05B 19/042; G05B 2219/2639;
(Continued)

(56) References Cited

U.S. PATENT DOCUMENTS 10,504,195 B2    12/2019  Sun et al.
10,796,252 B2 *  10/2020  Werho ............... G06Q 30/0283
(Continued)

FOREIGN PATENT DOCUMENTS

CN    112116171 A    12/2020
CN    113991638 A    1/2022

OTHER PUBLICATIONS

International Application No. PCT/US2023/064623, International Search Report and the Written Opinion, dated Oct. 11, 2023, 23 pages.

(Continued)

*Primary Examiner* — Jigneshkumar C Patel
(74) *Attorney, Agent, or Firm* — Ahmann Kloke LLP

(57) ABSTRACT

An example method includes, at a weather forecast time, determining a lag between a target renewable energy site and a first nearby site for which respective power measurements are correlated, selecting a first forecast look-ahead time, determining if the first forecast look-ahead time is less than or equal to the lag, determining a series of lagged power measurements at a time of forecast which constitute a series of correlation-based forecasts for power generation at the target site based on the lag, generating a set of ramp predictors incorporating correlation-based forecasts from the first site and the first forecast look-ahead time, receiving power forecast errors, applying sets of decision trees to the predictors and the power forecast errors to obtain predicted forecast errors, and generating second power forecasts for (Continued)

the set of look-ahead times of the target site based on the first power forecasts and the predicted forecast errors.

19 Claims, 19 Drawing Sheets

(51) Int. Cl.
| | |
|---|---|
| *G06N 5/01* | (2023.01) |
| *H02J 3/00* | (2026.01) |
| *H02J 3/38* | (2026.01) |
| *H02J 101/22* | (2026.01) |
| *H02J 101/28* | (2026.01) |

(52) U.S. Cl.
CPC .............. *H02J 3/004* (2020.01); *H02J 3/381* (2013.01); *G05B 2223/06* (2018.08); *H02J 2101/22* (2026.01); *H02J 2101/28* (2026.01)

(58) Field of Classification Search
CPC .......... G06N 5/01; G06N 3/08; G06N 3/0442; G06N 20/00; H02J 3/004; H02J 3/381; H02J 2300/22; H02J 2300/28
USPC ........................................................ 700/286
See application file for complete search history.

(56) References Cited

U.S. PATENT DOCUMENTS

| | | | |
|---|---|---|---|
| 11,416,786 B2 | 8/2022 | Helsel et al. | |
| 2007/0173982 A1* | 7/2007 | Cardinal ................. | F03D 7/048 |
| | | | 700/286 |
| 2010/0145533 A1* | 6/2010 | Cardinal ................. | H02J 3/381 |
| | | | 700/291 |
| 2017/0030333 A1 | 2/2017 | Srivastava et al. | |
| 2017/0033795 A1 | 2/2017 | Zafrany et al. | |
| 2017/0102725 A1 | 4/2017 | Parvania | |
| 2017/0228834 A1* | 8/2017 | Hoff ........................ | G06Q 50/06 |
| 2020/0028360 A1 | 1/2020 | Heintel et al. | |
| 2020/0150309 A1 | 5/2020 | Dann | |
| 2021/0103051 A1 | 4/2021 | Tang | |
| 2022/0003894 A1 | 1/2022 | Shapiro et al. | |
| 2023/0103959 A1 | 4/2023 | Pavlovski et al. | |
| 2023/0299580 A1 | 9/2023 | Keerthisinghe et al. | |
| 2023/0315940 A1 | 10/2023 | Pjetri et al. | |
| 2025/0343413 A1 | 11/2025 | Horii et al. | |

OTHER PUBLICATIONS

International Application No. PCT/US2023/064623, International Preliminary Report on Patentability dated Sep. 26, 2024, 8 pages.

International Application No. PCT/US2023/064660, International Preliminary Report on Patentability dated Sep. 26, 2024, 7 pages.
International Application No. PCT/US2023/064660, International Search Report and the Written Opinion, dated Feb. 21, 2024, 8 pages.
Ramirez-Rosado, I et al. "Comparison of two new short-term wind-power forecasting systems," Elsevier, Renewable Energy 34 (2009) 1848-1854; Publication [online], Dec. 25, 2008 [retrieved on Nov. 13, 2023}. URL:https://www.sciencedirect.com/science/article/abs/pii/S0960148108004321.
Australian Patent Application No. 2023235317, Examiner's First Report dated Sep. 17, 2025, 4 pages.
Australian Patent Application No. 2023236822, Examination Report dated Jun. 26, 2025, 3 pages.
"Renewable energy power forecasting technology", IEC TR 63043:2020, IEC, 3, Rue De Varembé, PO Box 131, 1 CH-1211 Geneva 20, Switzerland, Nov. 27, 2020 (Nov. 27, 2020), pp. 1-138, XP082021854, Retrieved from the Internet: URL:ftp://standard.iec.ch/iectr63043{ed1. 0}en.pdf [retrieved on Nov. 27, 2020].
European Patent Application No. 23771705.3, Supplementary Search Report dated Jan. 26, 2026, 10 pages.
Ouyang Tinghui et al, "Ramp events forecasting based on long-term wind power prediction and correction", IET Renewable Power Generation, the Institution of Engineering And Technology, Michael Faraday House, Six Hills Way, Stevenage, Herts. SG1 2AY, UK, vol. 13, No. 15, Nov. 18, 2019 (Nov. 18, 2019), pp. 2793-2801, XP006086277, ISSN: 1752-1416, DOI: 10.1049/IET-RPG.2019. 0093.
European Patent application No. 23771721.0, Extended European Search Report dated Mar. 4, 2026, 12 pages.
Li, Yiyan et al, A TCN-based Hybrid Forecasting Framework for Hours-ahead Utility-scale PV Forecasting, Arxiv.org, Cornell University Library, 201 OLIN Library Cornell University, Ithaca, NY 14853, Nov. 16, 2021 (Nov. 16, 2021), XP091296274.
Ouyang, Tinghui et al, Ramp events forecasting based on long-term wind power prediction and correction, IET Renewable Power Generation, The Institution of Engineering and Technology, Michael Faraday House, Six Hills Way, Stevenge, Herts. SG1 2AY, UK, vol. 13, No. 15, Nov. 18, 2019 (Nov. 18, 2019), pp. 2793-2801, XP006086277, ISSN: 1752-1416, DOI: 10.1049/IET-RPG.2019. 0093.
Tawn, R. et al, A review of very short-term wind and solar power forecasting, Renewable and Sustainable Energy Reviews, Elseviers Science, New York, NY, US, vol. 153, Oct. 23, 2021 (Oct. 23, 2021), XP086848508, ISSN: 1364-0321, DOI: 10.1016/J.RSER.2021. 111758.
Yang, Dazhi et al, Very short term irradiance forecasting using the lasso, Solar Energy, Elsevier, Amsterdam, NL, vol. 114, Feb. 27, 2015 (Feb. 27, 2015), pp. 314-326, XP029582181, ISSN: 0038-092X, DOI:10.1016/J.SOLENER.2015.01.016.

* cited by examiner

Variable Power Generation Forecast System 104

Communication Module 202

Data Set Generation Module 204

Ramp Predictor Generation Module 206

Training and Curation Module 208

Power Forecasting Module 210

Forecast Error Calculation Module 212

Forecast Error Prediction Module 214

Notification Module 216

Data Storage 220

500

| Look-ahead Time | Start of the Time Window | End of the Time Window |
|---|---|---|
| 10 Minutes | -30 Minutes (Measured Data) | 2 Hours 10 Minutes (Look-ahead Time + 2 Hours) |
| 20 Minutes | -30 Minutes (Measured Data) | 2 Hours 20 Minutes (Look-ahead Time + 2 Hours) |
| 30 Minutes | 0 Forecast-at-time | 2 Hours 30 Minutes (Look-ahead Time + 2 Hours) |
| 1 Hour to 3 Hours 30 Minutes | Look-ahead Time - 30 Minutes | Look-ahead Time + 2 Hours |
| 3 Hours 30 Minutes to 6 Hours | 2 Hours 30 Minutes | Look-ahead Time + 2 Hours |

FIG. 5

Variable Power Generation Forecast System 1100

Communication Module 1102

Data Set Generation Module 1104

Ramp Predictor Generation Module 1106

Training and Curation Module 1108

Power Forecasting Module 1110

Forecast Error Calculation Module 1112

Forecast Error Prediction Module 1114

Notification Module 1116

Data Storage 1120

SYSTEMS AND METHODS FOR RAMP PREDICTIONS FOR FORECASTING POWER USING NEIGHBORING SITES

CROSS-REFERENCE TO RELATED APPLICATIONS

This application claims priority to U.S. Provisional Patent Application No. 63/269,541, filed on Mar. 17, 2022 and entitled "SHORT-TERM WIND POWER FORECASTS USING RAMP PREDICTION" and to U.S. Provisional Patent Application No. 63/488,629, filed on Mar. 6, 2023 and entitled "IMPROVED SHORT-TERM WIND POWER FORECASTS: LOW LATENCY FEEDBACK ERROR CORRECTION USING RAMP PREDICTION AND DATA FROM NEARBY FARMS," and is related to co-pending application U.S. patent application Ser. No. 18/185,682, filed on Mar. 17, 2023 and entitled "SYSTEMS AND METHODS FOR FORECASTING POWER GENERATED BY VARIABLE POWER GENERATION ASSETS," each of which is incorporated in its entirety herein by reference.

FIELD OF THE INVENTIONS

Embodiments of the present invention(s) are generally related to forecasting power generated by variable power generation assets such as wind turbines and solar power farms, and in particular to forecasting power generated by the variable power generation assets using ramp predictors.

BACKGROUND

The variable and uncertain nature of power generation by variable power generation assets such as wind turbines and solar power farms places a premium on the accuracy of power generation forecasts. Greater forecast accuracy enables an operator of variable power generation assets to enhance market efficiency and improve the operational reliability of the power system.

Further, balancing authorities, responsible for maintaining the balance between load and generation within their territory, may impose imbalance penalties on the operators of variable power generation assets if their output varies too much from their forecast. Accurate wind power forecasts reduce or eliminate the imbalance penalties that asset operators must pay.

SUMMARY

In some embodiments, a non-transitory computer-readable medium comprises executable instructions. The executable instructions being executable by one or more processors to perform a method. The method may comprise at a weather forecast time, determining a lag between a target renewable energy site and a first nearby site for which respective power measurements are correlated, selecting a first forecast look-ahead time, determining if the first forecast look-ahead time is less than or equal to the lag between the target renewable energy site and the first nearby site for which the respective power measurements are correlated, determining a series of lagged power measurements at a time of forecast which constitute a series of correlation-based forecasts for power generation at the target renewable energy site, the series of lagged power measurements being based at least in part on the lag between the target renewable energy site and the first nearby site, generating a set of ramp predictors incorporating correlation-based forecasts from the first site for the time of forecast and the first forecast look-ahead time based on the series of lagged power measurements, the series of lagged power measurements being based at least in part on the lag between the target renewable energy site and the first nearby site, each of the set of ramp predictors including a difference between measured power at a time index and a measured power at a current timestamp, receiving power forecast errors for one or more variable power generation assets of the first target renewable energy site, applying sets of decision trees to one or more of the predictors of the set of ramp predictors and the power forecast errors to obtain predicted forecast errors, and generating second power forecasts for the set of look-ahead times for one or more variable power generation assets of the target renewable energy site based on the first power forecasts and the predicted forecast errors.

In various embodiments, determining the lag between the target renewable energy site and the first nearby site for which the respective power measurements are correlated comprises at the weather forecast time, determine the lag between the target renewable energy site and the first nearby site for which the respective power measurements are maximally correlated with a first correlation coefficient of the target renewable energy site and the first nearby site that is dependent on time. The first correlation coefficient of the target renewable energy site and the first nearby site may change over time based on weather conditions.

In some embodiments, the first nearby site is a renewable energy site. The series of lagged power measurements may be determined if a first correlation coefficient of the target renewable energy site and the first nearby site is greater than a threshold value, the first correlation coefficient indicating a strength of the correlation between the first nearby site and the target renewable energy site. The measured power may be correlation-based forecast power.

In some embodiments, wherein the series of lagged power measurements are determined if the first forecast look-ahead time is less than or equal to the lag between the target renewable energy site and the first nearby site for which the respective power measurements are correlated.

In various embodiments, the example method may further comprise at the weather forecast time, determining a lag between the target renewable energy site and a second nearby site for which respective power measurements are correlated, determining if the first forecast look-ahead time is less than or equal to the lag between the target renewable energy site and the second nearby site for which the respective power measurements are correlated, generating a series of lagged power measurements at the time of forecast which constitute a series of correlation-based forecasts for power generation at the target renewable energy site, the series of lagged power measurements being based at least in part on the lag between the target renewable energy site and the second nearby site, and determine a set of ramp predictors incorporating correlation-based forecasts from the first site for the time of forecast and the first forecast look-ahead time based on the series of lagged power measurements, the series of lagged power measurements being based at least in part on the lag between the target renewable energy site and the second nearby site, each of the set of the set of ramp predictors including a difference between measured power at a time index and a measured power at a current timestamp.

Applying the sets of decision trees to one or more of the predictors of the set of ramp predictors and the power forecast errors to obtain the predicted forecast errors may comprise selecting at least one of the one of more of the set of ramp predictors with a most positive correlation coefficient relative to others of the set of ramp predictors and applying the sets of decision trees to the at least the one of the one or more of the set of ramp predictors.

An example system comprises at least one processor and memory containing instructions, the instructions being executable by the at least one processor to: at a weather forecast time, determine a lag between a target renewable energy site and a first nearby site for which respective power measurements are correlated, select a first forecast look-ahead time, determine if the first forecast look-ahead time is less than or equal to the lag between the target renewable energy site and the first nearby site for which the respective power measurements are correlated, determine a series of lagged power measurements at a time of forecast which constitute a series of correlation-based forecasts for power generation at the target renewable energy site, the series of lagged power measurements being based at least in part on the lag between the target renewable energy site and the first nearby site, generate a set of ramp predictors incorporating correlation-based forecasts from the first site for the time of forecast and the first forecast look-ahead time based on the series of lagged power measurements, the series of lagged power measurements being based at least in part on the lag between the target renewable energy site and the first nearby site, each of the set of ramp predictors including a difference between measured power at a time index and a measured power at a current timestamp, receive power forecast errors for one or more variable power generation assets of the first renewable energy site, apply sets of decision trees to one or more of the predictors of the set of ramp predictors and the power forecast errors to obtain predicted forecast errors, and generate second power forecasts for the set of look-ahead times for one or more variable power generation assets of the target renewable energy site based on the first power forecasts and the predicted forecast errors.

In some embodiments, at the weather forecast time, determine the lag between the target renewable energy site and the first nearby site for which the respective power measurements are correlated, comprises at the weather forecast time, determine the lag between the target renewable energy site and the first nearby site for which the respective power measurements are maximally correlated with a first correlation coefficient of the target renewable energy site and the first nearby site that is dependent on time.

The first correlation coefficient of the target renewable energy site and the first nearby site may change over time based on weather conditions. The first nearby site may be a renewable energy site.

In some embodiments, the series of lagged power measurements are determined if a first correlation coefficient of the target renewable energy site and the first nearby site is greater than a threshold value, the first correlation coefficient indicating a strength of the correlation between the first nearby site and the target renewable energy site. The measured power may be correlation-based forecast power.

The series of lagged power measurements may be determined if the first forecast look-ahead time is less than or equal to the lag between the target renewable energy site and the first nearby site for which the respective power measurements are correlated.

The system may further comprise, at the weather forecast time, determine a lag between the target renewable energy site and a second nearby site for which respective power measurements are correlated, determine if the first forecast look-ahead time is less than or equal to the lag between the target renewable energy site and the second nearby site for which the respective power measurements are correlated, determine a series of lagged power measurements at the time of forecast which constitute a series of correlation-based forecasts for power generation at the target renewable energy site, the series of lagged power measurements being based at least in part on the lag between the target renewable energy site and the second nearby site, and generate a set of ramp predictors incorporating correlation-based forecasts from the first site for the time of forecast and the first forecast look-ahead time based on the series of lagged power measurements, the series of lagged power measurements being based at least in part on the lag between the target renewable energy site and the second nearby site, each of the set of the set of ramp predictors including a difference between measured power at a time index and a measured power at a current timestamp.

In some embodiments, apply the sets of decision trees to one or more of the predictors of the set of ramp predictors and the power forecast errors to obtain the predicted forecast errors comprises select at least one of the one of more of the set of ramp predictors with a most positive correlation coefficient relative to others of the set of ramp predictors and apply the sets of decision trees to the at least the one of the one or more of the set of ramp predictors.

An example method comprises, at a weather forecast time, determining a lag between a target renewable energy site and a first nearby site for which respective power measurements are correlated, selecting a first forecast look-ahead time, determining if the first forecast look-ahead time is less than or equal to the lag between the target renewable energy site and the first nearby site for which the respective power measurements are correlated, determining a series of lagged power measurements at a time of forecast which constitute a series of correlation-based forecasts for power generation at the target renewable energy site, the series of lagged power measurements being based at least in part on the lag between the target renewable energy site and the first nearby site, generating a set of ramp predictors incorporating correlation-based forecasts from the first site for the time of forecast and the first forecast look-ahead time based on the series of lagged power measurements, the series of lagged power measurements being based at least in part on the lag between the target renewable energy site and the first nearby site, each of the set of ramp predictors including a difference between measured power at a time index and a measured power at a current timestamp, receiving power forecast errors for one or more variable power generation assets of the first renewable energy site, applying sets of decision trees to one or more of the predictors of the set of ramp predictors and the power forecast errors to obtain predicted forecast errors, and generating second power forecasts for the set of look-ahead times for one or more variable power generation assets of the target renewable energy site based on the first power forecasts and the predicted forecast errors.

In some embodiments, the techniques described herein relate to a non-transitory computer-readable medium including executable instructions, the executable instructions being executable by one or more processors to perform a method, the method including: receiving first power forecasts for a set of look-ahead times for one or more variable power generation assets, a variable power generation asset subject to ramp events, a ramp event being a large variation in power generated by the variable power generation asset within a short period of time; receiving generated power measurements for the one or more variable power generation assets, the generated power measurements including a reference generated power measurement and one or more generated power measurements prior to the reference generated power measurement; generating ramp predictors for the set of look-ahead times, a ramp predictor including a set of values, a value obtained by subtracting the reference generated power measurement from one of the one or more generated power measurements prior to the reference generated power measurement or by subtracting the reference generated power measurement from a first power forecast for a look-ahead time of the set of look-ahead times; receiving power forecast errors for the one or more variable power generation assets; applying sets of decision trees to the ramp predictors and the power forecast errors to obtain predicted forecast errors; and generating second power forecasts for the set of look-ahead times for the one or more variable power generation assets based on the first power forecasts and the predicted forecast errors.

In various embodiments, the techniques described herein relate to a non-transitory computer-readable medium wherein generating second power forecasts for the set of look-ahead times for the one or more variable power generation assets based on the first power forecasts and the predicted forecast errors includes adding the first power forecasts and the predicted forecast errors to obtain the second power forecasts.

In some embodiments, the techniques described herein relate to a non-transitory computer-readable medium wherein a set of values for a ramp predictor for a look-ahead time of the set of look-ahead times that is prior to or at a threshold look-ahead time includes values obtained by subtracting the reference generated power measurement from the one or more generated power measurements prior to the reference generated power measurement and values obtained by subtracting the reference generated power measurement from a subset of the first power forecasts for a subset of the set of look-ahead times.

In some embodiments, the techniques described herein relate to a non-transitory computer-readable medium wherein a set of values for a ramp predictor for a look-ahead time of the set of look-ahead times that is after a threshold look-ahead time includes values obtained by subtracting the reference generated power measurement from a subset of the first power forecasts for a subset of the set of look-ahead times.

In some embodiments, the techniques described herein relate to a non-transitory computer-readable medium, the method further including: receiving weather forecast data for a geographic area that includes the one or more variable power generation assets; and applying a machine learning forecast model to the generated power measurements and the weather forecast data to obtain a first subset of the first power forecasts for a first subset of the set of look-ahead times that are prior to or at a threshold look-ahead time.

In some embodiments, the techniques described herein relate to a non-transitory computer-readable medium, the method further including applying the machine learning forecast model to the weather forecast data to obtain a second subset of the first power forecasts for a second subset of the set of look-ahead times that are after a threshold look-ahead time.

In some embodiments, the techniques described herein relate to a non-transitory computer-readable medium, the method further including: receiving weather forecast data for a geographic area that includes the one or more variable power generation assets; and applying at a first time a machine learning forecast model to the generated power measurements and the weather forecast data to obtain the first power forecasts for the set of look-ahead times, wherein the reference generated power measurement is a power measurement for the one or more variable power generation assets measured at a time generally at or just prior to the first time.

In some embodiments, the techniques described herein relate to a non-transitory computer-readable medium wherein a size of the set of values for the ramp predictor for a particular look-ahead time of the set of look-ahead times is based on the particular look-ahead time.

In some embodiments, the techniques described herein relate to a non-transitory computer-readable medium, the method further including: receiving a power forecast data set; generating a ramp predictor data set based on the power forecast data set; generating a forecast error data set based on the power forecast data set; and training the sets of decision trees on the power forecast data set, the ramp predictor data set, and the forecast error data set.

In some embodiments, the techniques described herein relate to a non-transitory computer-readable medium wherein the second power forecasts have an average normalized mean-absolute error (nMAE) for the set of look-ahead times that is lower than an average nMAE for the set of look-ahead times that the first power forecasts have.

In some embodiments, the techniques described herein relate to a method including: receiving first power forecasts for a set of look-ahead times for one or more variable power generation assets, a variable power generation asset subject to ramp events, a ramp event being a large variation in power generated by the variable power generation asset within a short period of time; receiving generated power measurements for the one or more variable power generation assets, the generated power measurements including a reference generated power measurement and one or more generated power measurements prior to the reference generated power measurement; generating ramp predictors for the set of look-ahead times, a ramp predictor including a set of values, a value obtained by subtracting the reference generated power measurement from one of the one or more generated power measurements prior to the reference generated power measurement or by subtracting the reference generated power measurement from a first power forecast for a look-ahead time of the set of look-ahead times; receiving power forecast errors for the one or more variable power generation assets; applying sets of decision trees to the ramp predictors and the power forecast errors to obtain predicted forecast errors; and generating second power forecasts for the set of look-ahead times for the one or more variable power generation assets based on the first power forecasts and the predicted forecast errors.

In some embodiments, the techniques described herein relate to a method wherein generating second power forecasts for the set of look-ahead times for the one or more variable power generation assets based on the first power forecasts and the predicted forecast errors includes adding the first power forecasts and the predicted forecast errors to obtain the second power forecasts.

In some embodiments, the techniques described herein relate to a method wherein a set of values for a ramp predictor for a look-ahead time of the set of look-ahead times that is prior to or at a threshold look-ahead time includes values obtained by subtracting the reference generated power measurement from the one or more generated power measurements prior to the reference generated power measurement and values obtained by subtracting the reference generated power measurement from a subset of the first power forecasts for a subset of the set of look-ahead times.

In some embodiments, the techniques described herein relate to a method wherein a set of values for a ramp predictor for a look-ahead time of the set of look-ahead times that is after a threshold look-ahead time includes values obtained by subtracting the reference generated power measurement from a subset of the first power forecasts for a subset of the set of look-ahead times.

In some embodiments, the techniques described herein relate to a method, further including: receiving weather forecast data for a geographic area that includes the one or more variable power generation assets; and applying a machine learning forecast model to the generated power measurements and the weather forecast data to obtain a first subset of the first power forecasts for a first subset of the set of look-ahead times that are prior to or at a threshold look-ahead time.

In some embodiments, the techniques described herein relate to a method, further including applying the machine learning forecast model to the weather forecast data to obtain a second subset of the first power forecasts for a second subset of the set of look-ahead times that are after a threshold look-ahead time.

In some embodiments, the techniques described herein relate to a method, further including: receiving weather forecast data for a geographic area that includes the one or more variable power generation assets; and applying at a first time a machine learning forecast model to the generated power measurements and the weather forecast data to obtain the first power forecasts for the set of look-ahead times, wherein the reference generated power measurement is a power measurement for the one or more variable power generation assets measured at a time generally at or just prior to the first time.

In some embodiments, the techniques described herein relate to a method wherein a size of the set of values for the ramp predictor for a particular look-ahead time of the set of look-ahead times is based on the particular look-ahead time.

In some embodiments, the techniques described herein relate to a method, further including: receiving a power forecast data set; generating a ramp predictor data set based on the power forecast data set; generating a forecast error data set based on the power forecast data set; and training the sets of decision trees on the power forecast data set, the ramp predictor data set, and the forecast error data set.

In some embodiments, the techniques described herein relate to a system including at least one processor and memory containing instructions, the instructions being executable by the at least one processor to: receive first power forecasts for a set of look-ahead times for one or more variable power generation assets, a variable power generation asset subject to ramp events, a ramp event being a large variation in power generated by the variable power generation asset within a short period of time; receive generated power measurements for the one or more variable power generation assets, the generated power measurements including a reference generated power measurement and one or more generated power measurements prior to the reference generated power measurement; generate ramp predictors for the set of look-ahead times, a ramp predictor including a set of values, a value obtained by subtracting the reference generated power measurement from one of the one or more generated power measurements prior to the reference generated power measurement or by subtracting the reference generated power measurement from a first power forecast for a look-ahead time of the set of look-ahead times; receive power forecast errors for the one or more variable power generation assets; apply sets of decision trees to the ramp predictors and the power forecast errors to obtain predicted forecast errors; and generate second power forecasts for the set of look-ahead times for the one or more variable power generation assets based on the first power forecasts and the predicted forecast errors.

In some embodiments, the techniques described herein relate to a non-transitory computer-readable medium including executable instructions, the executable instructions being executable by one or more processors to perform a method, the method including: receiving first weather forecast data for a geographic area, the geographic area including one or more variable power generation assets, a variable power generation asset subject to ramp events, a ramp event being a large variation in the power generated by the one or more variable power generation assets within a short period of time; receiving first generated power measurements for the one or more variable power generation assets, the first generated power measurements including a first reference generated power measurement and one or more first generated power measurements prior to the first reference generated power measurement; applying a machine learning forecast model to the first weather forecast data and the first generated power measurements to obtain first power forecasts for a first set of look-ahead times for the one or more variable power generation assets; receiving second weather forecast data for the geographic area; receiving second generated power measurements for the one or more variable power generation assets, the second generated power measurements including a second reference generated power measurement and one or more second generated power measurements prior to the second reference generated power measurement; generating first ramp predictors for a second set of look-ahead times, a first ramp predictor including a set of values, a value obtained by subtracting the second reference generated power measurement from one of the one or more second generated power measurements prior to the second reference generated power measurement or by subtracting the second reference generated power measurement from a first power forecast for a look-ahead time of the first set of look-ahead times; and applying the machine learning forecast model to the second weather forecast data, the second generated power measurements, and the first ramp predictors to obtain second power forecasts for a second set of look-ahead times for the one or more variable power generation assets.

In some embodiments, the techniques described herein relate to a non-transitory computer-readable medium, the method further including: receiving third weather forecast data for the geographic area; receiving third generated power measurements for the one or more variable power generation assets, the third generated power measurements including a third reference generated power measurement and one or more third generated power measurements prior to the third reference generated power measurement; generating second ramp predictors for a third set of look-ahead times, a second ramp predictor including a set of values, a value obtained by subtracting the third reference generated power measurement from one of the one or more third generated power measurements prior to the third reference generated power measurement or by subtracting the third reference generated power measurement from a second power forecast for a look-ahead time of the second set of look-ahead times; and applying the machine learning forecast model to the third weather forecast data, the third generated power measurements, and the second ramp predictors to obtain third power forecasts for a third set of look-ahead times for the one or more variable power generation assets.

In some embodiments, the techniques described herein relate to a non-transitory computer-readable medium wherein a set of values for a first ramp predictor for a look-ahead time of the first set of look-ahead times that is prior to or at a threshold look-ahead time includes values obtained by subtracting the reference generated power measurement from the one or more generated power measurements prior to the reference generated power measurement and values obtained by subtracting the reference generated power measurement from a subset of the first power forecasts for a subset of the first set of look-ahead times.

In some embodiments, the techniques described herein relate to a non-transitory computer-readable medium wherein a set of values for a first ramp predictor for a look-ahead time of the first set of look-ahead times that is after a threshold look-ahead time includes values obtained by subtracting the reference generated power measurement from a subset of the first power forecasts for a subset of the first set of look-ahead times.

In some embodiments, the techniques described herein relate to a non-transitory computer-readable medium wherein applying the machine learning forecast model to the first weather forecast data and the first generated power measurements to obtain first power forecasts includes applying the machine learning forecast model to the first weather forecast data and the first generated power measurements to obtain a first subset of the first power forecasts for a first subset of the first set of look-ahead times that are prior to or at a threshold look-ahead time.

In some embodiments, the techniques described herein relate to a non-transitory computer-readable medium wherein applying the machine learning forecast model to the first weather forecast data and the first generated power measurements to obtain first power forecasts includes applying the machine learning forecast model to the first weather forecast data to obtain a second subset of the first power forecasts for a second subset of the first set of look-ahead times that are after a threshold look-ahead time.

In some embodiments, the techniques described herein relate to a non-transitory computer-readable medium wherein applying the machine learning forecast model to the first weather forecast data and the first generated power measurements to obtain the first power forecasts for the first set of look-ahead times for the one or more variable power generation assets includes applying at a first time the machine learning forecast model to the first weather forecast data and the first generated power measurements to obtain the first power forecasts for the first set of look-ahead times for the one or more variable power generation assets, and where the reference generated power measurement is a power measurement for the one or more variable power generation assets measured at a time generally at or just prior to the first time.

In some embodiments, the techniques described herein relate to a non-transitory computer-readable medium wherein a size of the set of values for the first ramp predictor for a particular look-ahead time of the first set of look-ahead times is based on the particular look-ahead time.

In some embodiments, the techniques described herein relate to a non-transitory computer-readable medium, the method further including: receiving a training data set, the training data set including historical data from the one or more variable power generation assets; training a precursor machine learning forecast model on the training data set; receiving a power forecast data set from the precursor machine learning forecast model; generating a ramp predictor data set based on the power forecast data set; and training the machine learning forecast model on the training data set and the ramp predictor data set.

In some embodiments, the techniques described herein relate to a method including: receiving first weather forecast data for a geographic area, the geographic area including one or more variable power generation assets, a variable power generation asset subject to ramp events, a ramp event being a large variation in the power generated by the one or more variable power generation assets within a short period of time; receiving first generated power measurements for the one or more variable power generation assets, the first generated power measurements including a first reference generated power measurement and one or more first generated power measurements prior to the first reference generated power measurement; applying a machine learning forecast model to the first weather forecast data and the first generated power measurements to obtain first power forecasts for a first set of look-ahead times for the one or more variable power generation assets; receiving second weather forecast data for the geographic area; receiving second generated power measurements for the one or more variable power generation assets, the second generated power measurements including a second reference generated power measurement and one or more second generated power measurements prior to the second reference generated power measurement; generating first ramp predictors for a second set of look-ahead times, a first ramp predictor including a set of values, a value obtained by subtracting the second reference generated power measurement from one of the one or more second generated power measurements prior to the second reference generated power measurement or by subtracting the second reference generated power measurement from a first power forecast for a look-ahead time of the first set of look-ahead times; and applying the machine learning forecast model to the second weather forecast data, the second generated power measurements, and the first ramp predictors to obtain second power forecasts for a second set of look-ahead times for the one or more variable power generation assets.

In some embodiments, the techniques described herein relate to a method, further including: receiving third weather forecast data for the geographic area; receiving third generated power measurements for the one or more variable power generation assets, the third generated power measurements including a third reference generated power measurement and one or more third generated power measurements prior to the third reference generated power measurement; generating second ramp predictors for a third set of look-ahead times, a second ramp predictor including a set of values, a value obtained by subtracting the third reference generated power measurement from one of the one or more third generated power measurements prior to the third reference generated power measurement or by subtracting the third reference generated power measurement from a second power forecast for a look-ahead time of the second set of look-ahead times; and applying the machine learning forecast model to the third weather forecast data, the third generated power measurements, and the second ramp predictors to obtain third power forecasts for a third set of look-ahead times for the one or more variable power generation assets.

In some embodiments, the techniques described herein relate to a method wherein a set of values for a first ramp predictor for a look-ahead time of the first set of look-ahead times that is prior to or at a threshold look-ahead time includes values obtained by subtracting the reference generated power measurement from the one or more generated power measurements prior to the reference generated power measurement and values obtained by subtracting the reference generated power measurement from a subset of the first power forecasts for a subset of the first set of look-ahead times.

In some embodiments, the techniques described herein relate to a method wherein a set of values for a first ramp predictor for a look-ahead time of the first set of look-ahead times that is after a threshold look-ahead time includes values obtained by subtracting the reference generated power measurement from a subset of the first power forecasts for a subset of the first set of look-ahead times.

In some embodiments, the techniques described herein relate to a method wherein applying the machine learning forecast model to the first weather forecast data and the first generated power measurements to obtain first power forecasts includes applying the machine learning forecast model to the first weather forecast data and the first generated power measurements to obtain a first subset of the first power forecasts for a first subset of the first set of look-ahead times that are prior to or at a threshold look-ahead time.

In some embodiments, the techniques described herein relate to a method wherein applying the machine learning forecast model to the first weather forecast data and the first generated power measurements to obtain first power forecasts includes applying the machine learning forecast model to the first weather forecast data to obtain a second subset of the first power forecasts for a second subset of the first set of look-ahead times that are after a threshold look-ahead time.

In some embodiments, the techniques described herein relate to a method wherein applying the machine learning forecast model to the first weather forecast data and the first generated power measurements to obtain the first power forecasts for the first set of look-ahead times for the one or more variable power generation assets includes applying at a first time the machine learning forecast model to the first weather forecast data and the first generated power measurements to obtain the first power forecasts for the first set of look-ahead times for the one or more variable power generation assets, and where the reference generated power measurement is a power measurement for the one or more variable power generation assets measured at a time generally at or just prior to the first time.

In some embodiments, the techniques described herein relate to a method wherein a size of the set of values for the first ramp predictor for a particular look-ahead time of the first set of look-ahead times is based on the particular look-ahead time.

In some embodiments, the techniques described herein relate to a method, further including: receiving a training data set, the training data set including historical data from the one or more variable power generation assets; training a precursor machine learning forecast model on the training data set; receiving a power forecast data set from the precursor machine learning forecast model; generating a ramp predictor data set based on the power forecast data set; and training the machine learning forecast model on the training data set and the ramp predictor data set.

In some embodiments, the techniques described herein relate to a system including at least one processor and memory containing instructions, the instructions being executable by the at least one processor to: receive first weather forecast data for a geographic area, the geographic area including one or more variable power generation assets, a variable power generation asset subject to ramp events, a ramp event being a large variation in the power generated by the one or more variable power generation assets within a short period of time; receive first generated power measurements for the one or more variable power generation assets, the first generated power measurements including a first reference generated power measurement and one or more first generated power measurements prior to the first reference generated power measurement; apply a machine learning forecast model to the first weather forecast data and the first generated power measurements to obtain first power forecasts for a first set of look-ahead times for the one or more variable power generation assets; receive second weather forecast data for the geographic area; receive second generated power measurements for the one or more variable power generation assets, the second generated power measurements including a second reference generated power measurement and one or more second generated power measurements prior to the second reference generated power measurement; generate first ramp predictors for a second set of look-ahead times, a first ramp predictor including a set of values, a value obtained by subtracting the second reference generated power measurement from one of the one or more second generated power measurements prior to the second reference generated power measurement or by subtracting the second reference generated power measurement from a first power forecast for a look-ahead time of the first set of look-ahead times; and apply the machine learning forecast model to the second weather forecast data, the second generated power measurements, and the first ramp predictors to obtain second power forecasts for a second set of look-ahead times for the one or more variable power generation assets.

In some embodiments, the techniques described herein relate to a system, the instructions being further executable by the at least one processor to: receive third weather forecast data for the geographic area; receive third generated power measurements for the one or more variable power generation assets, the third generated power measurements including a third reference generated power measurement and one or more third generated power measurements prior to the third reference generated power measurement; generate second ramp predictors for a third set of look-ahead times, a second ramp predictor including a set of values, a value obtained by subtracting the third reference generated power measurement from one of the one or more third generated power measurements prior to the third reference generated power measurement or by subtracting the third reference generated power measurement from a second power forecast for a look-ahead time of the second set of look-ahead times; and apply the machine learning forecast model to the third weather forecast data, the third generated power measurements, and the second ramp predictors to obtain third power forecasts for a third set of look-ahead times for the one or more variable power generation assets.

BRIEF DESCRIPTION OF THE DRAWINGS

FIG. 5 depicts a table with time windows for ramp predictors for different look-ahead times in some embodiments.

Throughout the drawings, like reference numerals will be understood to refer to like parts, components, and structures.

DETAILED DESCRIPTION

Figure 1:
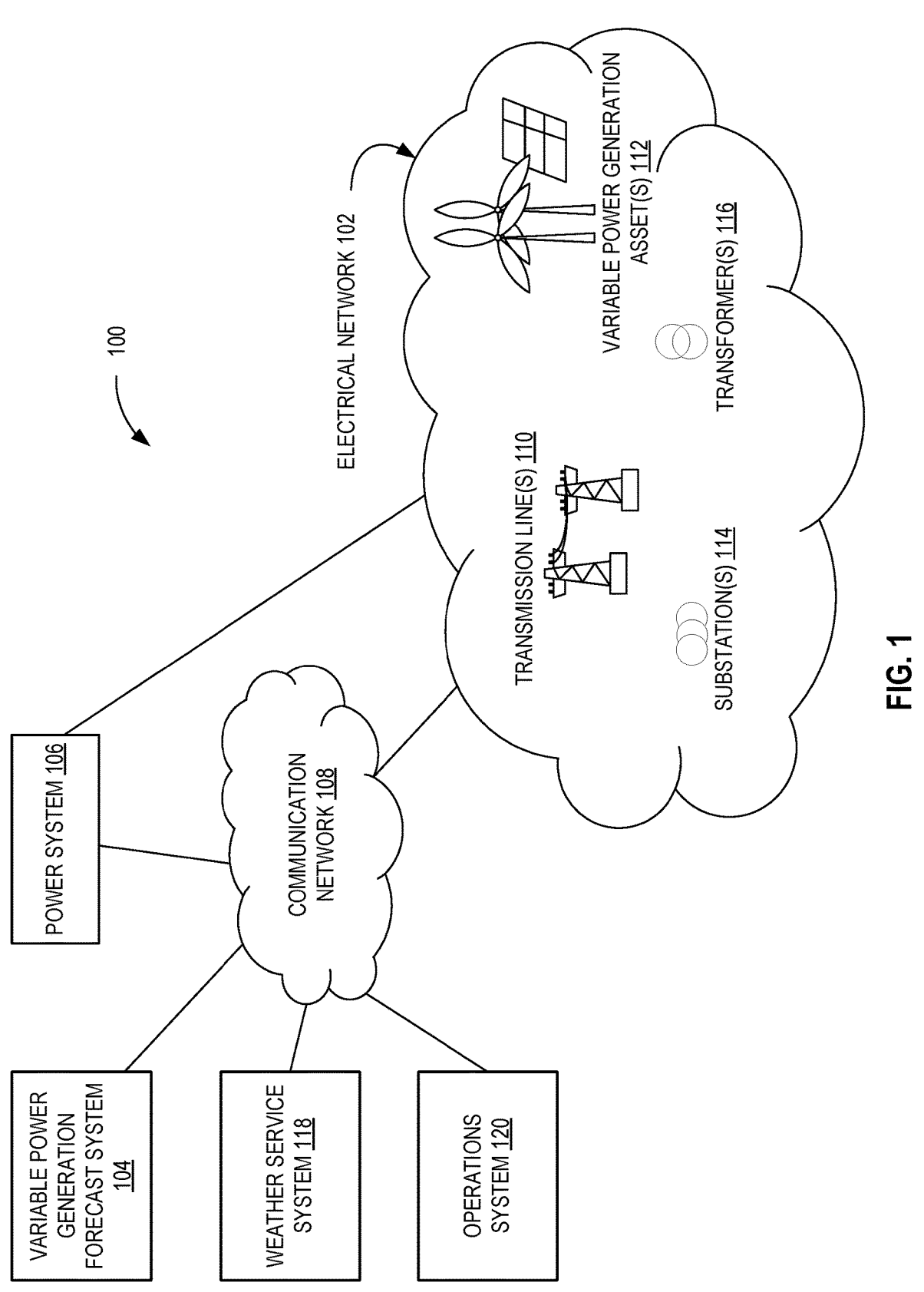
FIG. 1 depicts an example variable power generation forecast environment in some embodiments.

Variable power generation assets such as wind turbines or solar power farms, may be subject to ramp events. For a wind turbine, a ramp event is a large variation in wind power output that is observed at the wind turbine, at multiple wind turbines, or at a wind farm or wind farms within a short period of time (for example, up to a few hours). A ramp event may occur when the wind speed and/or direction is rapidly changing. For a solar power farm, a ramp event may be a large variation in solar power output that is observed at one or more solar panels or at the solar panel farm within a short period of time (for example, up to a few hours). A ramp event may occur when cloud cover is intermittent and rapidly changing. A ramp event may be characterized by its magnitude and duration. Ramp events may result in large errors in power forecasts for the variable power generation assets.

In some embodiments, the variable power generation forecast systems described herein use ramp predictors to improve the accuracy of benchmark power forecasts for the variable power generation assets. The variable power generation forecast systems may obtain or generate benchmark power forecasts for variable power generation assets. The variable power generation forecast systems may generate ramp predictors using the benchmark wind power forecasts and optionally, generated power measurements from the variable power generation assets. In some embodiments, the variable power generation forecast system utilizes a feedback error correction model that predicts forecast errors for the benchmark power forecasts at various look-ahead times based on the ramp predictors and last known forecast errors of the benchmark power forecasts. The variable power generation forecast systems may use the predicted forecast errors and the benchmark power forecasts to generate power forecasts at the various look-ahead times that are more accurate than the benchmark power forecasts.

The benchmark power forecasts for the variable power generation assets may be generated by models, such as physical models and data-driven models. Physical models typically use weather forecast data, such as numerical weather prediction (NWP) data, for forecasting power generation for look-ahead times ranging from several hours up to six days. Data-driven models can be divided into statistical and machine learning models. Statistical models include, for example, auto-regressive integrated moving average, auto-regressive moving average, coupled auto-regressive and dynamic system, and Markov models. Machine learning models, for example, include support vector machine, feed-forward neural networks, recurrent neural networks such as long short-term memory networks and decision trees such as eXtreme gradient boosting (XG-Boost). Data-driven models may use weather forecast data, generated power measurement data, and/or other asset data or metadata from the variable power generation for forecasting power generation for look-ahead times ranging from several minutes up to several hours. In various embodiments, the variable power generation forecast systems described herein may provide the ramp predictors as input to models, such as physical models and/or data-driven models, which generate benchmark power forecasts for use in generating more accurate power forecasts.

Generating more accurate power forecasts has many advantages. For example, more accurate power forecasts may provide significant monetary benefits for both power system operators and operators of variable power generation assets. The benefits may depend on the market structure and the operational practice. The cost savings from improved forecasts may be higher for power systems with high penetration of renewable energy sources, but some savings may further depend on the mix of conventional generation resources. For example, cost savings may be greater in a coal-dominated system than in a natural gas-dominated system because of the savings from high startup and shutdown costs. As another example, more accurate power forecasts may provide reliability benefits due to improved certainty about the amount of power that variable power generation assets will generate.

For a target power generation site with a number of nearby sites, various embodiments disclose methods for constructing a predictor referred to as neighborhood ramp predictor (or "RP2") using power measurements from one or more nearby sites (e.g., power generation sites), which, when added to the predictors of machine learning forecast model, and after retraining of the model, may improve accuracy of power forecasts at the target site.

In some embodiments, the structure of the neighborhood ramp predictor may be identical to other ramp prediction systems and methods described herein that do not rely on nearby sites (e.g., nearby renewable energy farms). However, in some embodiments, nearby sites provide information about coming rapid changes (e.g., ramp events) at the target site that is not available when considering weather models or measurements at the target site alone. As a result, RP2 may provide greater improvements in forecast accuracy, particularly for shorter look-aheads.

FIG. 1 depicts an example variable power generation forecast environment 100 in some embodiments. The variable power generation forecast environment 100 includes an electrical network 102, a variable power generation forecast system 104, a power system 106, a weather service system 118, and an operations system 120 in communication over a communication network 108. The electrical network 102 may include any number of the transmission lines 110, the variable power generation assets 112, the substations 114, and the transformers 116. The electrical network 102 may include any number of electrical assets including protective assets (for example, relays or other circuits to protect one or more assets), transmission assets (for example, lines, or devices for delivering or receiving power), and/or loads (for example, residential houses, commercial businesses, and/or the like).

Components of the electrical network 102 such as the transmission lines 110, the variable power generation assets 112, the substations 114, and/or the transformers 116 may inject energy or power (or assist in the injection of energy or power) into the electrical network 102. Each component of the electrical network 102 may be represented by any number of nodes in a network representation of the electrical network. The variable power generation assets 112 may be or include solar panels, wind turbines, and/or any other power generation device or system that produces power on an intermittent or variable basis, such as tidal power generators and wave power generators. The electrical network 102 may include a wide electrical network grid (for example, with 40,000 assets or more). Each electrical asset of the electrical network 102 may represent one or more elements of their respective assets. For example, the transformers 116, as shown in FIG. 1 may represent any number of transformers which make up electrical network 102.

The variable power generation forecast system 104 may be or include any number of digital devices configured to forecast power generated by the variable power generation assets 112. A digital device is any device with a processor and memory. Digital devices are discussed, for example, with reference to FIG. 18. In some embodiments, the variable power generation forecast system 104 may receive sensor data from any number of sensors of any number of electrical assets of a target renewable energy site, sensors from any number of sites (e.g., nearby renewable energy sites), event data, and production data of the variable power generation assets 112. The variable power generation forecast system 104 may also receive weather forecast data from the weather service system 118. The variable power generation forecast system 104 may process such data to produce power forecasts for the variable power generation assets 112.

Although sites are often discussed herein as referring to renewable energy sites, it will be appreciated that the sites may refer to a site that include any energy asset(s) that provides variable power (e.g., wind or solar).

The power system 106 may be or include any number of digital devices configured to control distribution and/or transmission of energy. The power system 106 may, in various examples, be controlled by a power company, utility, and/or the like.

The weather service system 118 may be or include any number of digital devices configured to provide weather forecast data, such as numerical weather prediction (NWP) data. The weather service system 118 may, in various examples, be controlled by government agencies (for example, the U.S. National Weather Service) or by commercial organizations (for example, Spire or Tomorrow.io).

The operations system 120 may be or include any number of digital devices configured to operate and/or monitor the variable power generation assets 112. The operations system 120 may receive notifications including power forecasts from the variable power generation forecast system 104. The operations system 120 may then provide such information to the power system 106 and/or other systems that utilize power forecasts for variable power generation assets 112. The operations system may, in various examples, be controlled by an operator of the variable power generation assets 112.

In some embodiments, the communication network 108 represents one or more computer networks (for example, LAN, WAN, and/or the like). The communication network 108 may provide communication between any of the variable power generation forecast system 104, the power system 106, the weather service system 118, the operations system 120, and/or the electrical network 102. In some implementations, communication network 108 comprises computer devices, routers, cables, and/or other network topologies. In some embodiments, the communication network 108 may be wired and/or wireless. In various embodiments, the communication network 108 may comprise the Internet, one or more networks that may be public, private, IP-based, non-IP based, and so forth.

Figure 2:
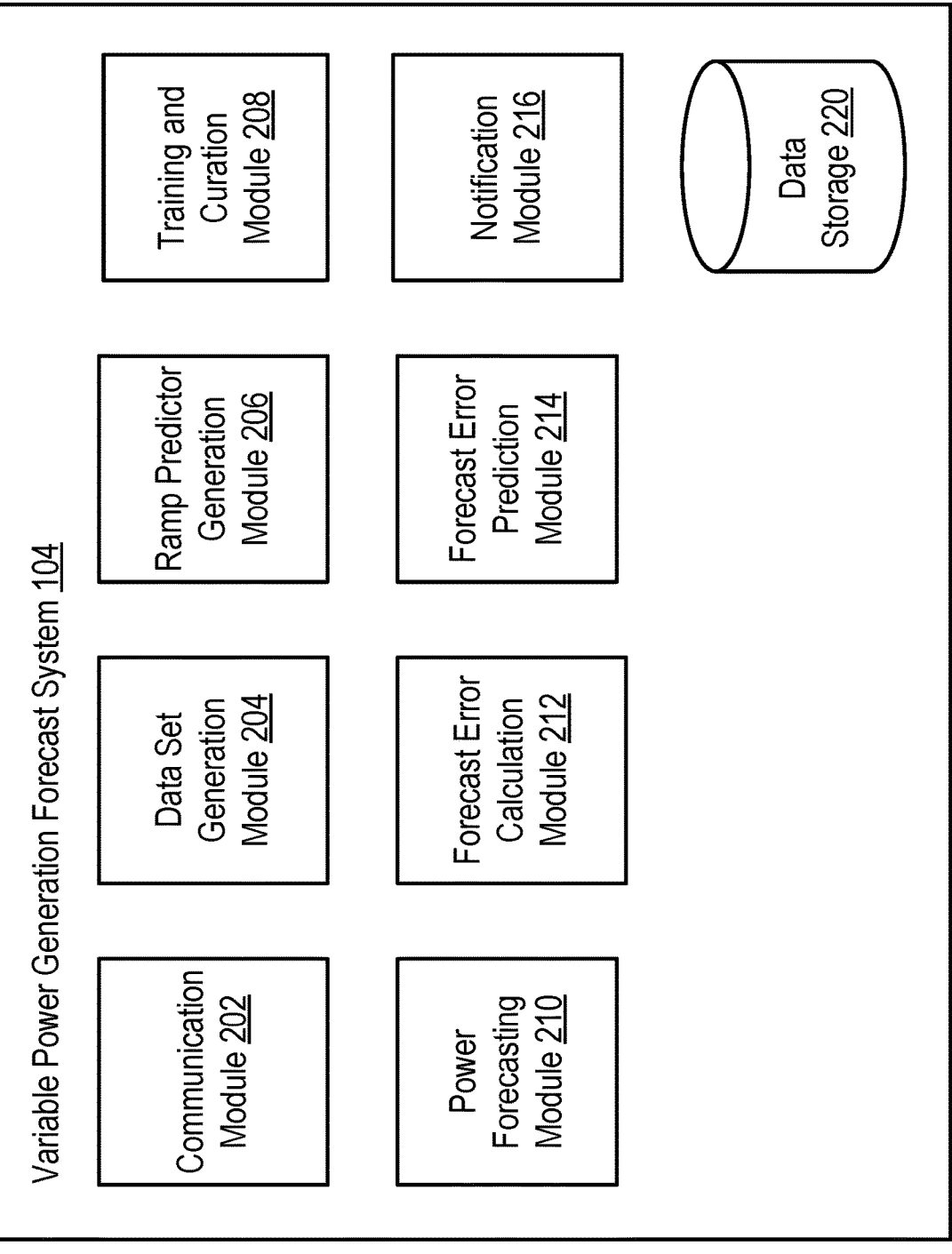
FIG. 2 depicts a block diagram of a variable power generation forecast system in some embodiments.

FIG. 2 depicts a block diagram of the variable power generation forecast system 104 in some embodiments. The variable power generation forecast system 104 includes a communication module 202, a data set generation module 204, a ramp predictor generation module 206, a training and curation module 208, a power forecasting module 210, a forecast error calculation module 212, a forecast error prediction module 214, a notification module 216, and a data storage 220.

The communication module 202 may send and/or receive requests and/or data between the variable power generation forecast system 104 and any of the power system 106, the operations system 120 and the electrical network 102. The communication module 202 may receive requests and/or data from the power system 106, the weather service system 118, the operations system 120 and/or the electrical network 102. The communication module 202 may also send requests and/or data to the power system 106, the weather service system 118, the operations system 120 and/or the electrical network 102.

The data set generation module 204 may generate various data sets for use in training machine learning forecast models and/or accuracy booster models.

The ramp predictor generation module 206 may generate ramp predictors for a set of look-ahead times. The ramp predictor generation module 206 may generate one ramp predictor for each look-ahead time of the set of look-ahead times.

The training and curation module 208 may train artificial intelligence and/or machine learning systems (for example, neural networks, multiple sets of decision trees) to be applied to various types of data (for example, power measurement data, weather forecast data, ramp predictors, last known forecast errors) to generate forecasts and/or predictions (for example, power forecasts, power forecast errors).

The power forecasting module 210 may apply artificial intelligence and/or machine learning systems to various types of data (for example, power measurement data, weather forecast data, ramp predictors, last known forecast errors) to generate forecasts and/or predictions (for example, power forecasts, power forecast errors).

The forecast error calculation module 212 may calculate forecast errors in power forecasts generated by the power forecasting module 210.

The forecast error prediction module 214 may apply artificial intelligence and/or machine learning systems to data, such as ramp predictors and forecast errors, to generate predicted forecast errors in power forecasts.

The notification module 216 may generate and provide notifications that include power forecasts generated by the power forecasting module 210. The notification module 216 may provide reports, alerts, and/or dashboards that include results, confidence scores, and/or other information.

The data storage 220 may include data stored, accessed, and/or modified by any of the modules of the variable power generation forecast system 104, such as the machine learning forecast models and the accuracy booster models described herein. The data storage 220 may include any number of data storage structures such as tables, databases, lists, and/or the like.

A module may be hardware, software, firmware, or any combination. For example, each module may include functions performed by dedicated hardware (for example, an Application-Specific Integrated Circuit (ASIC), a Field Programmable Gate Array (FPGA), or the like), software, instructions maintained in ROM, and/or any combination. Software may be executed by one or more processors. Although a limited number of modules are depicted in FIG. 2, there may be any number of modules. Further, individual modules may perform any number of functions, including functions of multiple modules as shown herein.

Figure 3:
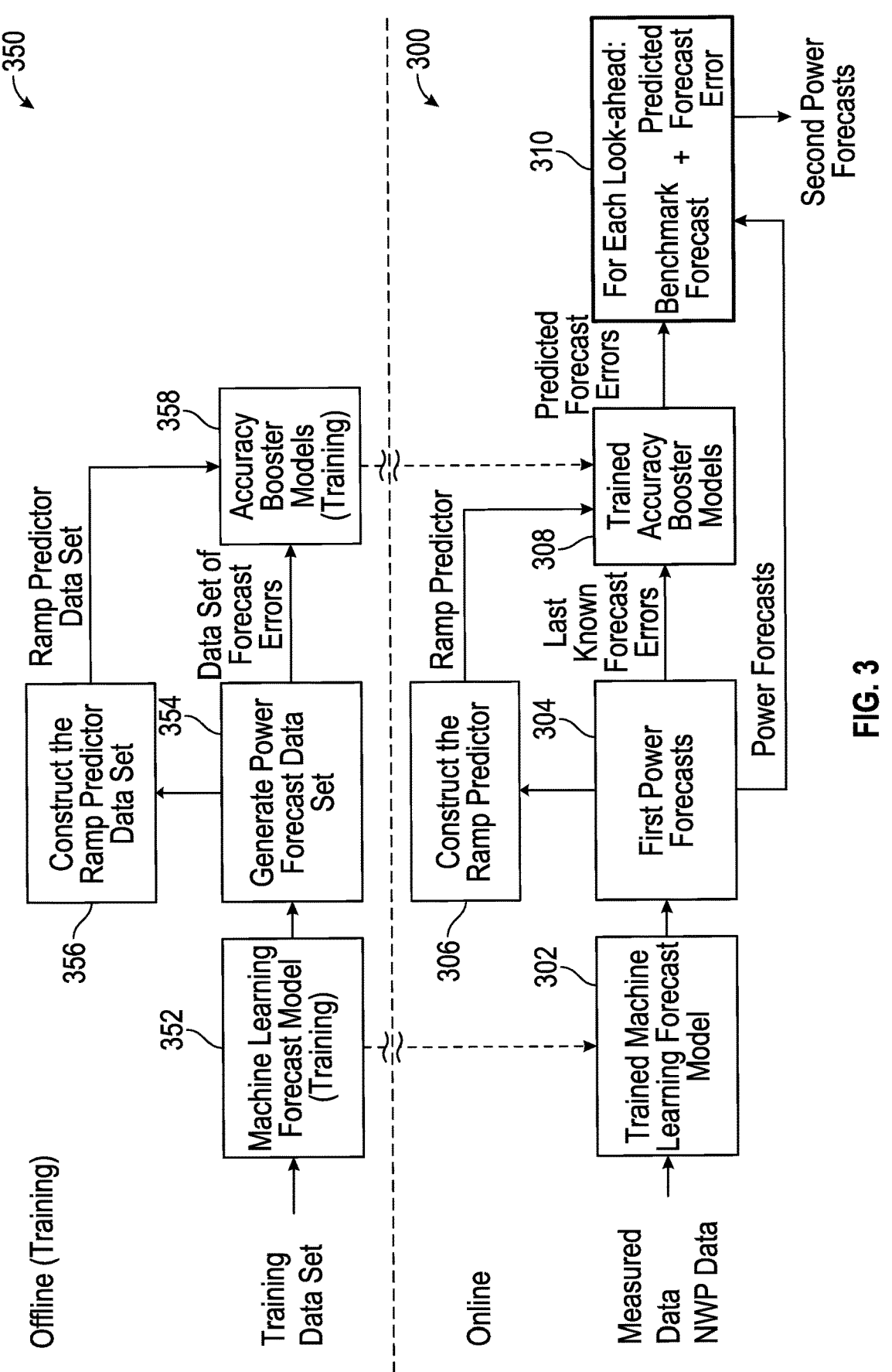
FIG. 3 depicts a process for online forecasting using an accuracy booster model and a process for offline training of the accuracy booster model in some embodiments.

FIG. 3 depicts a method 300 for online forecasting using trained accuracy booster models and a method 350 for offline training of the accuracy booster models in some embodiments. The variable power generation forecast system 104 performs the method 300. The method 300 for online forecasting using the trained accuracy booster models begins at a block 302 where the power forecasting module 210 receives data, which includes generated power measurements for one or more of the variable power generation assets 112, weather forecast data (for example, Numerical Weather Prediction (NWP) data) for a geographic area that includes the one or more of the variable power generation assets 112, and may include additional data and/or metadata for the one or more variable power generation assets 112 (for example, wind turbine capacity rating). The generated power measurements may include a last generated power measurement that may have been measured generally at or just prior to a time the power forecasting module 210 generates power forecasts. The generated power measurements may also include one or more generated power measurements prior to the last generated power measurement. The last generated power measurement is referred to herein as a reference generated power measurement.

Also at the block 302, the power forecasting module 210 applies a trained machine learning forecast model to all or a portion of the received data to obtain first power forecasts for a set of look-ahead times for the one or more variable power generation assets. The set of look-ahead times may include look-ahead times from approximately 10 minutes from a time of forecast to approximately six hours from the time of forecast. There may be look-ahead times within the set of look-ahead times every period of time (for example, every 10 minutes) or the period of time may vary (for example, may change from every 10 minutes to every 30 minutes). For example, the set of look-ahead times may include look-ahead times every 10 minutes from the time of forecast to six hours from the time of forecast. In some embodiments, a look-ahead time may occur every first period of time for a first subset of the set of look-ahead times and every second period of time for a second subset of the set of look-ahead times. For example, the set of look-ahead times may include look-ahead times every 10 minutes from the time of forecast up to three hours and 30 minutes from the time of forecast, and every 30 minutes from four hours from the time of forecast to six hours from the time of forecast. It will be appreciated that the set of look-ahead times may include any number of look-ahead times within a future period of time following the time of forecast.

In some embodiments, the power forecasting module 210 may apply the trained machine learning forecast model to the generated power measurements and the weather forecast data to obtain a first subset of the first power forecasts for a first subset of the set of look-ahead times that are prior to or at a threshold look-ahead time. In such embodiments the power forecasting module 210 may apply the trained machine learning forecast model to the weather forecast data, and not the generated power measurements, to obtain a second subset of the first power forecasts for a second subset of the set of look-ahead times that are after the threshold look-ahead time. For example, the power forecasting module 210 may apply the trained machine learning forecast model to the generated power measurements and the weather forecast data to obtain the first subset of the first set of power forecasts for look-ahead times that are from approximately 10 minutes, inclusive, to a threshold look-ahead time of approximately three hours and 30 minutes, inclusive. Furthermore, the power forecasting module 210 may apply the trained machine learning forecast model to the weather forecast data, and not the generated power measurements, to obtain the second subset of the first power forecasts for look-ahead times that are after the threshold look-ahead time of approximately three hours and 30 minutes to six hours, inclusive. The use of only weather forecast data for look-ahead times after approximately three hours and 30 minutes may result in a reduction of accuracy of the first power forecasts but also requires fewer computational resources to train the machine learning forecast model and to apply the trained machine learning forecast model.

At a block 304, the forecast error calculation module 212 calculates power forecast errors based on the previously generated power measurements and the previous power forecasts. The forecast error calculation module 212 calculates power forecast errors by subtracting previously generated power measurements from previous power forecasts. The forecast error calculation module 212 calculates a power forecast error $$P_{k,l}^{e}$$

for a particular look-ahead time 1 at timestamp k by subtracting the generated power measurement $$P_k^m$$

from the power forecast $$P_{k,l}^f$$

as shown by the following equation:

$$P_{k,l}^e = P_{k,l}^f - P_k^m \tag{1}$$

The forecast error calculation module 212 provides the power forecast errors to the forecast error prediction module 214 at block 308, described in more detail herein.

Also at block 304, the power forecasting module 210 provides the first power forecasts to block 310 (described in more detail herein) and to the ramp predictor generation module 206 at block 306. At block 306, the ramp predictor generation module 206 generates ramp predictors for the set of look-ahead times. The ramp predictor generation module 206 generates one ramp predictor for each look-ahead time of the set of look-ahead times. A ramp predictor includes a set of values. The ramp predictor generation module 206 obtains each value by subtracting the reference generated power measurement from one of the one or more generated power measurements prior to the reference generated power measurement or by subtracting the reference generated power measurement from a first power forecast for a look-ahead time of the set of look-ahead times.

Figure 4:
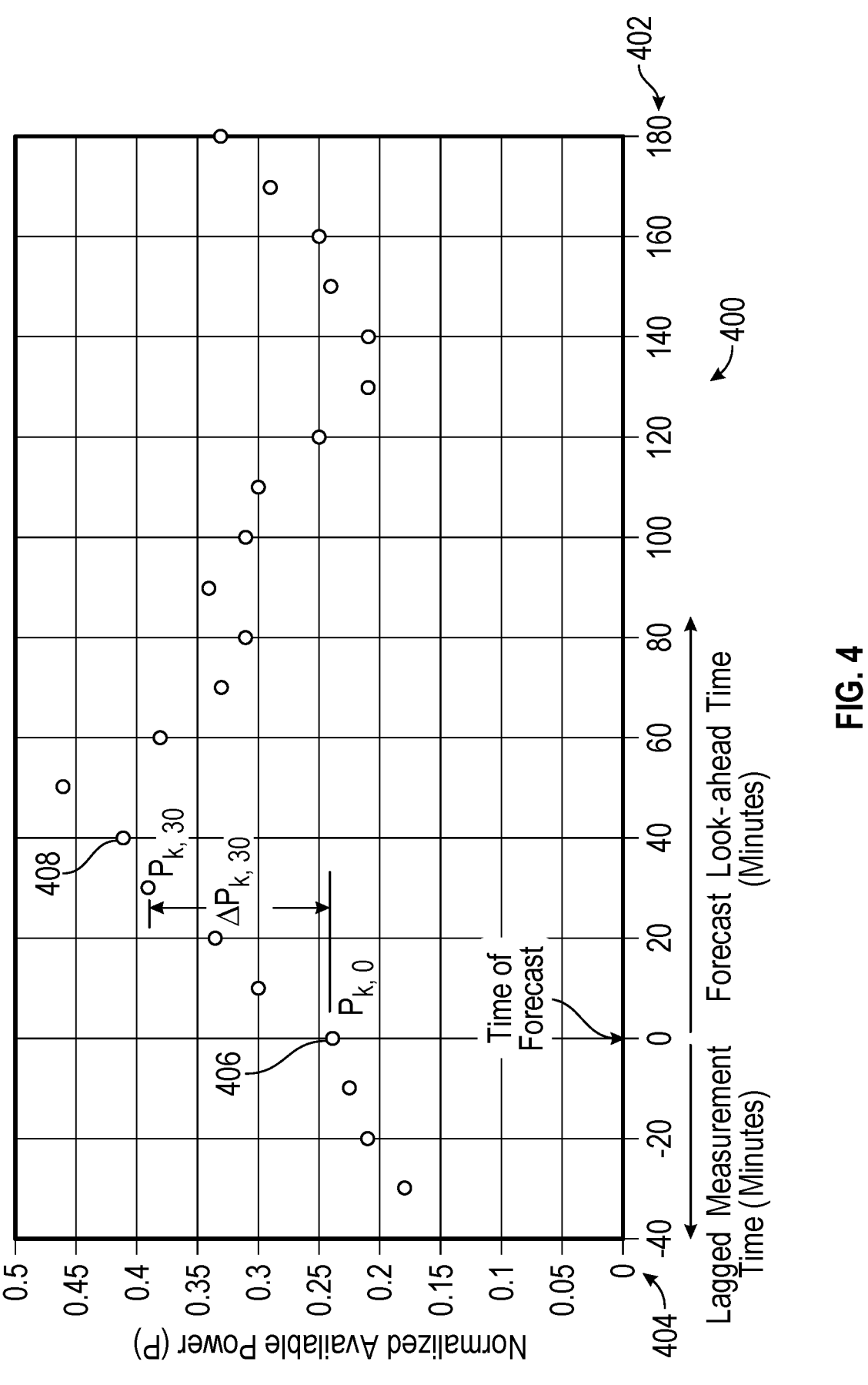
FIG. 4 depicts a graph illustrating how a ramp predictor may be generated for one or more variable power generation assets in some embodiments.

FIG. 4 depicts a graph 400 illustrating how the ramp predictor generation module 206 may generate ramp predictors in some embodiments. The discussion for tramp prediction with regard to FIG. 4 does not rely on nearby renewable energy sites (also referred to herein as renewable energy farms). FIG. 4 discloses a ramp prediction method referred to as Ramp Predictor 1 (or RP1).

The graph 400 has an x-axis 402 for time in minutes from a time of forecast at time 0 and a y-axis 404 for normalized available power. The graph 400 displays multiple points, which are either generated power measurements (for times prior to or at the time of forecast) or first power forecasts (for times after the time of forecast). Point 406 is $P_{k,0}$, which is the reference generated power measurement. Point 408 is $P_{k,30}$, which is the first power forecast for 30 minutes from the time of forecast. The difference in normalized available power between point 406 and point 408 is $\Delta P_{k,30}$. The ramp predictor generation module 206 may use normalized available power measurements or absolute available power measurements in generating the ramp predictors.

The ramp predictor generation module 206 generates a ramp predictor $R_{k,l}$ for a particular look-ahead time 1 at timestamp k using the first power forecasts, and the generated power measurements for certain look-ahead times, over a time window, as shown by the following:

$$R_{k,l} = [\Delta P_{k,1}, \ldots \Delta P_{k,f} \ldots \Delta P_{k,F}] \tag{2}$$

In (2), $\Delta P_{k,f}$ is the power difference between either a first power forecast or a generated power measurement at time index, f, in the time window with the reference measured power $P_{k,0}$ at the current timestamp k, given by:

$$\Delta P_{k,f} = P_{k,f} - P_{k,0} \tag{3}$$

The time window brackets the particular look-ahead time, and the start and stop times for the time window depend on the particular look-ahead time. In other words, the ramp predictor generation module 206 will calculate $\Delta P_{k,1}$ using either a generated power measurement or a first power forecast for a time prior to the look-ahead time 1, and will calculate $\Delta P_{k,F}$ using a first power forecast for a look-ahead time subsequent to the look-ahead time 1. The size of the set of values for the ramp predictor for a particular look-ahead time of the set of look-ahead times is based on the particular look-ahead time. In other words, the number of values in the ramp predictor depends on the particular look-ahead time.

FIG. 5 depicts a table 500 with time windows for ramp predictors for different look-ahead times in some embodiments. For the particular look-ahead time l=10 (10 minutes from the current timestamp k), the start of the time window is −30 minutes. Therefore, the ramp predictor generation module 206 will obtain the first value in the ramp predictor for l=10 by subtracting the reference power measurement at k from the generated power measurement at k−30. The end of the time window is two hours and 10 minutes, which is two hours ahead of the particular look ahead-time l=10. Therefore, the ramp predictor generation module 206 will obtain the last value in the ramp predictor for the particular look-ahead time l=10 by subtracting the reference power measurement at k from the first power forecast for k+120. The ramp predictor generation module 206 may generate ramp predictors for other look-ahead times in the table 500 according to the starts of the time window and the ends of the time windows as listed in the table 500.

In some embodiments, the power forecasting module 210 generates first power forecasts for look-ahead times at 10 minute intervals from a look-ahead time of 10 minutes to a look-ahead time of six hours. In some embodiments, the power forecasting module 210 utilizes a first interval duration for look-ahead times that are prior to or at a certain threshold, and a second interval duration for look-ahead times that are after the certain threshold. For example, the power forecasting module 210 may generate a first subset of the first power forecasts for look-ahead times at 10 minute intervals from a look-ahead time of 10 minutes to a look-ahead time of three hours and 30 minutes. Furthermore, the power forecasting module 210 may generate a second subset of the first power forecasts for look-ahead times at 30 minute intervals for look-ahead times that are after three hours and 30 minutes, such as at four hours, four hours 30 minutes, and so on, up to six hours. In some embodiments, the power forecasting module 210 may vary the interval duration depending on a range of look-ahead times.

Returning to FIG. 3, at the block 308, the forecast error prediction module 214 receives the power forecast errors that the forecast error calculation module 212 calculated at the block 304 and the ramp predictors that the ramp predictor generation module 206 generated at the block 306. The forecast error prediction module 214 applies the trained accuracy booster models to the ramp predictors and the power forecast errors to obtain predicted forecast errors. In some embodiments, each of the trained accuracy booster models is a set of trained decision trees. The training of the decision trees is discussed with reference to, for example, the method 350.

At a block 310, the power forecasting module 210 generates second power forecasts for the set of look-ahead times based on the first power forecasts and the predicted forecast errors. In some embodiments, the power forecasting module 210 adds the power forecasts and the predicted forecast errors to obtain the second power forecasts for the set of look-ahead times. That is, to obtain a second power forecast $$P^i_{k,l}$$

for a look-ahead time l at timestamp k the power forecasting module 210 adds the predicted forecast error $$\hat{P}^e_{k,l}$$

to the first power forecast $$P^f_{k,l}$$

according to the following equation:

$$P^i_{k,l} = P^f_{k,l} + \hat{P}^e_{k,l} \tag{4}$$

After generating the second power forecasts, the notification module 216 may generate notifications including the second power forecasts, and the communication module 202 may provide the second power forecasts to the operations system 120 for display, further processing, and/or analysis. Additionally or alternatively, the communication module 202 may provide the second power forecasts to the power system 106 so that the power system 106 may use the second power forecasts in balancing load and generation.

The variable power generation forecast system 104 may perform the method 300 periodically, such as every 10 minutes, to generate the second power forecasts for the one or more of the variable power generation assets 112. One advantage of the method 300 is that the method 300 utilizes low latency generated power measurements from various sensors at the variable power generation assets 112. The low latency of this data allows the variable power generation forecast system 104 to generate the ramp predictors and last known forecast errors for use in predicting forecast errors on the same period as that of generating the first power forecasts. Accordingly, the variable power generation forecast system 104 may generate the second power forecasts generally at or just after the same time as generating the first power forecasts. As discussed herein with reference to, for example FIGS. 6-8, the low latency of this data also allows the variable power generation forecast system 104 to improve the accuracy of generated power forecasts.

FIG. 3 also depicts the method 350 for offline training of the accuracy booster models. The variable power generation forecast system 104 performs the method 350. The method 350 begins at a block 352 where the training and curation module 208 receives a training data set for use in training a machine learning forecast model that forecasts power generated by the variable power generation assets 112. The training data set may include historical power measurements of power generated by the variable power generation assets 112, metadata for the variable power generation assets 112 (for example, wind turbine capacity rating), and/or historical weather data. The communication module 202 may have previously received data in the training data set and stored the training data set in the data storage 220. The training and curation module 208 may receive the training data set from the data storage 220. The training and curation module 208 uses the training data set to train the machine learning forecast model.

In various embodiments, the machine learning forecast model may be or include one or more various machine learning and/or artificial intelligence (AI) architectures, such as support vector machines, feed-forward neural networks, recurrent neural networks such as long short-term memory networks, decision trees, and/or the like. In various embodiments, in addition to or as an alternative to a machine learning forecast model, one or more statistical models may be utilized (for example, auto-regressive integrated moving average, auto-regressive moving average, coupled auto-regressive and dynamic systems, and Markov models).

At a block 354, the data set generation module 204 generates a power forecast data set. The data set generation module 204 may use the trained machine learning forecast model to generate the power forecast data set. The power forecast data set may be for a historical period of time (for example, one year) for which actual power measurements of the variable power generation assets 112 are available. Also at the block 354 the data set generation module 204 generates a power forecast error data set. The data set generation module 204 may generate the power forecast error data set based on the power forecast data set and actual power measurements. For example, the data set generation module 204 may subtract the actual power measurements from the power forecasts (or vice-versa) to obtain their differences, which are the power forecast errors. The data set generation module 204 may use the power forecast errors to generate the power forecast error data set.

At a block 356 the data set generation module 204 generates a ramp predictor data set. The data set generation module 204 may generate the ramp predictor data set based on the power forecast data set and the actual power measurements. The ramp predictor data set may be for a historical period of time (for example, one year). The ramp predictor data set may include multiple ramp predictors that the ramp predictor generation module 206 generated as described herein with respect to, for example, the method 300.

At a block 358, the training and curation module 208 trains the accuracy booster models. In some embodiments, the each of the accuracy booster models is a set of decision trees. In some embodiments, the training and curation module 208 utilizes a Python XGBoost library to train the decision trees. In some embodiments, the training and curation module 208 generates a set of decision trees for each look-ahead time. The following table displays the hyper-parameters and their values that the training and curation module 208 uses to train each set of decision trees:

| Hyperparameter | Value |
| --- | --- |
| n estimators | 1000 |
| max depth | 5 |
| learning rate | 0.01 |
| subsample | 1 |
| colsample_bytree | 0.8 |

In various embodiments, one or more machine learning and/or artificial intelligence (AI) architectures may be utilized (for example, support vector machines, feed-forward neural networks, recurrent neural networks such as long short-term memory networks, and/or the like) in addition to or as an alternative to the sets of decision trees discussed herein. In various embodiments, one or more statistical models may be utilized (for example, auto-regressive integrated moving average, auto-regressive moving average, coupled auto-regressive and dynamic systems, and Markov models) in addition to or as an alternative to the sets of decision trees discussed herein. The one or more machine learning and/or AI architectures and/or statistical models may utilize the features discussed herein to generate forecast models and/or make forecasts.

Figures 6A, 6B:
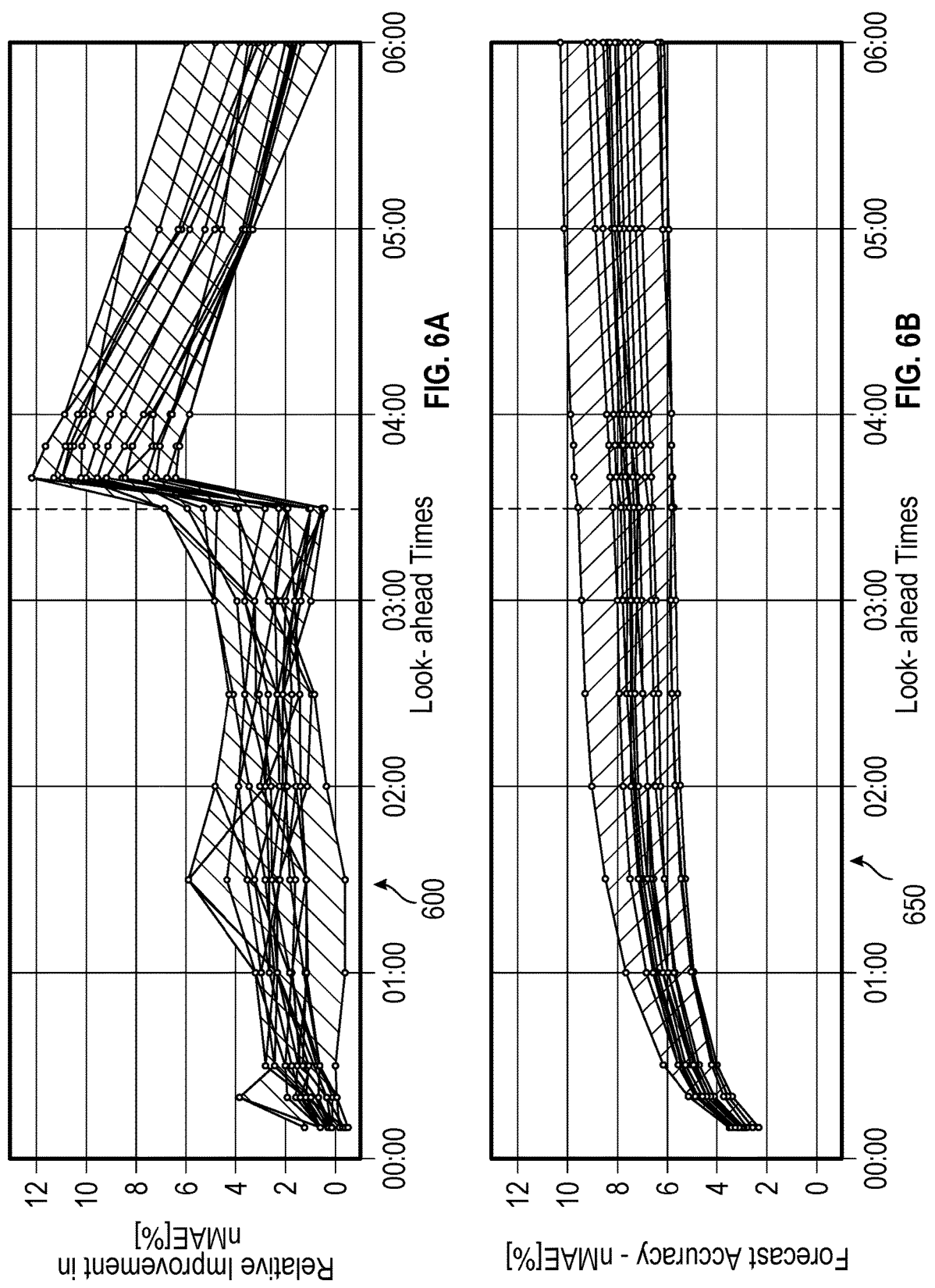
FIG. 6A and FIG. 6B depict graphs illustrating relative improvement in normalized mean-absolute-error for multiple variable power generation assets from using ramp predictors and final forecast accuracy for the multiple variable power generation assets from using ramp predictors in some embodiments.

FIG. 6A depicts a graph 600 illustrating relative improvement in normalized mean-absolute-error for multiple variable power generation assets from using ramp predictors in some embodiments. FIG. 6B depicts a graph 650 illustrating final forecast accuracy for the multiple variable power generation assets from using ramp predictors in some embodiments. The graph 600 shows the relative improvement in normalized mean-absolute-error (nMAE) for look-ahead times from 10 minutes to six hours for each of 17 groups of variable power generation assets. The graph 650 shows the final forecast accuracy, in terms of forecast accuracy minus nMAE, for the 17 groups of variable power generation assets. In this example, the 17 groups of variable power generation assets are 17 wind farms in northern Europe, each wind farm including one or more wind turbines. A dataset that included actual wind power time-series and meteorological data such as wind speed for the period of one year for the 17 wind farms was used to train the accuracy booster models. The relative decrease in nMAE, averaged over all look-ahead times and all 17 wind farms, is 3.61%, and the overall accuracy is 6.6% nMAE. Accordingly, power forecasts generated using ramp predictors have lower nMAE than power forecasts generated without using ramp predictors. A large component in this improvement is observed for look-ahead models for three hours 30 minutes and longer, such as out to at least 6 hours. These longer look-ahead times are from machine learning forecast models that rely solely on weather forecast data, such as Numerical Weather Prediction (NWP) data and may be less accurate than machine learning forecast models for shorter look-ahead times which include measurement data in addition to weather forecast data. Implementation of the ramp predictors in the variable power generation forecast system 104 may correct errors of the NWP-based forecast models, which results in a large improvement in the forecast accuracy at three hours 30 minutes and longer.

In some embodiments, using a training dataset for a historical period longer than one year may result in a larger relative improvement in nMAE. For example, using a dataset for a two-year period may result in a relative improvement in nMAE, averaged over all look-ahead times and all 17 wind farms, of 4.03%. In some embodiments, using a dataset for a historical period shorter than one year may result in a smaller relative improvement in nMAE. For example, using a dataset for a six-month period may result in a relative improvement in nMAE, averaged over all look-ahead times and all 17 wind farms, of 2.53%.

Figure 7:
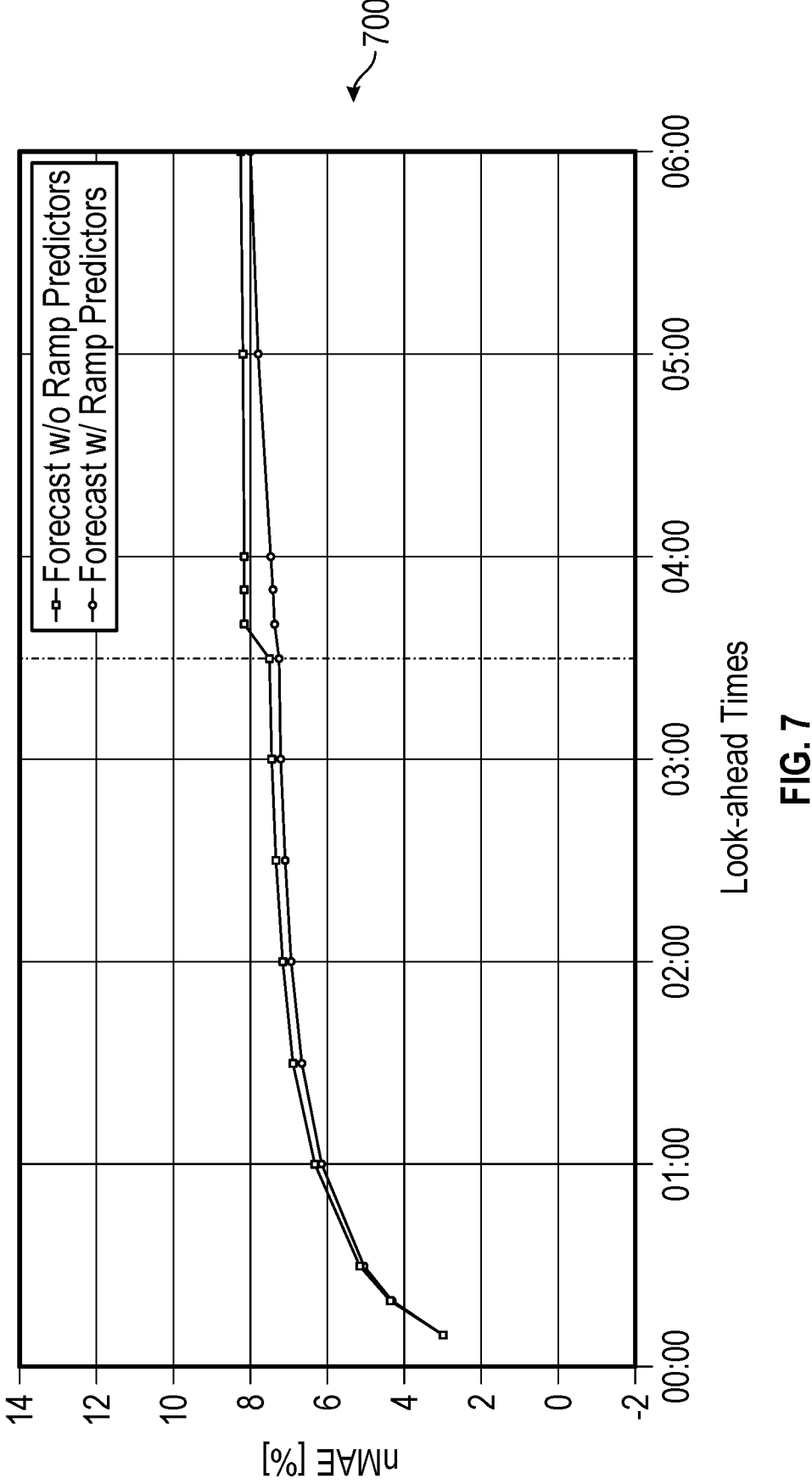
FIG. 7 depicts a graph illustrating normalized mean-absolute-errors for a forecast without ramp predictors and for a forecast with ramp predictors in some embodiments.

FIG. 7 depicts a graph 700 illustrating normalized mean-absolute-errors (nMAE) for a forecast without ramp predictors and for a forecast with ramp predictors in some embodiments. The nMAE of the forecast without ramp predictors increases smoothly and gradually as the look-ahead time increases to three hours and 30 minutes, with a steeper increase in nMAE with the switch to the weather forecast only (for example, NWP only) machine learning forecast model for longer look-ahead times. In contrast, the forecast with ramp predictors shows very little increase in nMAE that can be attributed to the transition to the weather forecast only (for example, NWP only) machine learning forecast model. Accordingly, the use of ramp predictors can reduce an increase in nMAE for longer look-ahead times.

Figure 8:
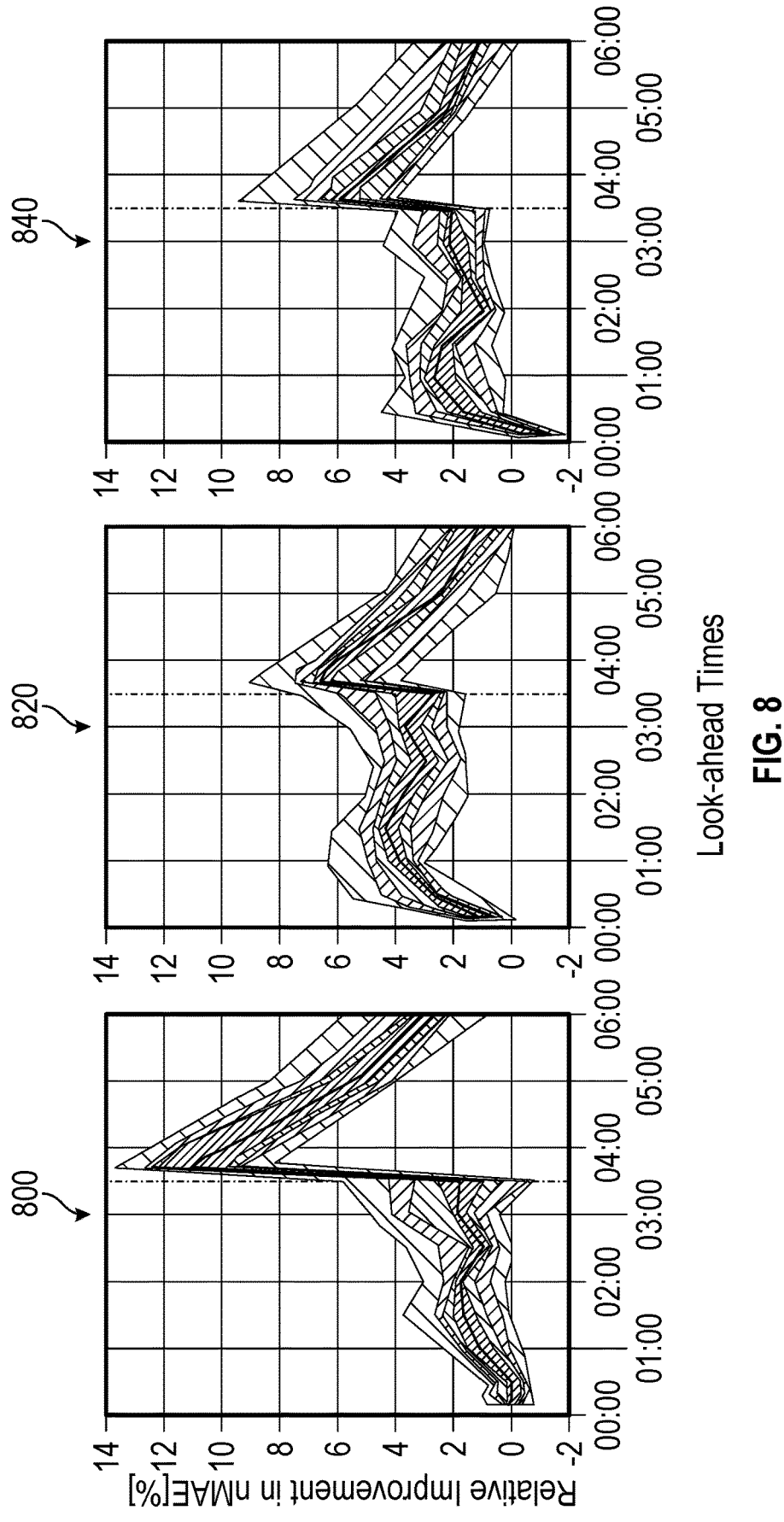
FIG. 8 depicts graphs illustrating relative improvement in normalized mean-absolute-error for multiple ramp event conditions in some embodiments.

FIG. 8 depicts a graph 800, a graph 820, and a graph 840 illustrating relative improvement in normalized mean-absolute-error (nMAE) for multiple ramp event conditions in some embodiments. The graph 800 illustrates relative improvement in nMAE for no ramp events. The graph 820 illustrates relative improvement in nMAE for a ramp up event. The graph 840 illustrates relative improvement in nMAE for a ramp down event. As can be seen in each of the graph 800, the graph 820, and the graph 840, implementing ramp predictors produces an overall positive effect on forecast accuracy during all ramp conditions. During the no-ramp event conditions (graph 800), a significant relative improvement in nMAE is observed for look-ahead times above three hours and 30 minutes. In this case, an advantage of the ramp predictor is in the fact that each value in the ramp predictor series (equation 2) is referenced to the last known power measurement at the wind farm's site (equation 3). This allows the machine learning forecast model to calibrate the forecasts from the weather forecast only (for example, NWP only) machine learning forecast models to the actual production levels of the wind farm, thus considerably reducing the error of the forecasts of the weather forecast only (for example, NWP only) machine learning forecast models.

The applied methodology also allowed an improvement in nMAE during ramp-up conditions (graph 820), especially for shorter look-ahead times. This may be a result of the ramp predictor allowing the model to better recognize the potential future variations of power production and thus improve forecast accuracy. The improvements during ramp-down events (graph 840) are overall smaller, with a slight decrease in nMAE for very short look-ahead times (10 and 20 minutes ahead). These results indicate that the ramp predictor could provide more valuable information to detect ramp-up events than ramp-down events.

Figure 9:
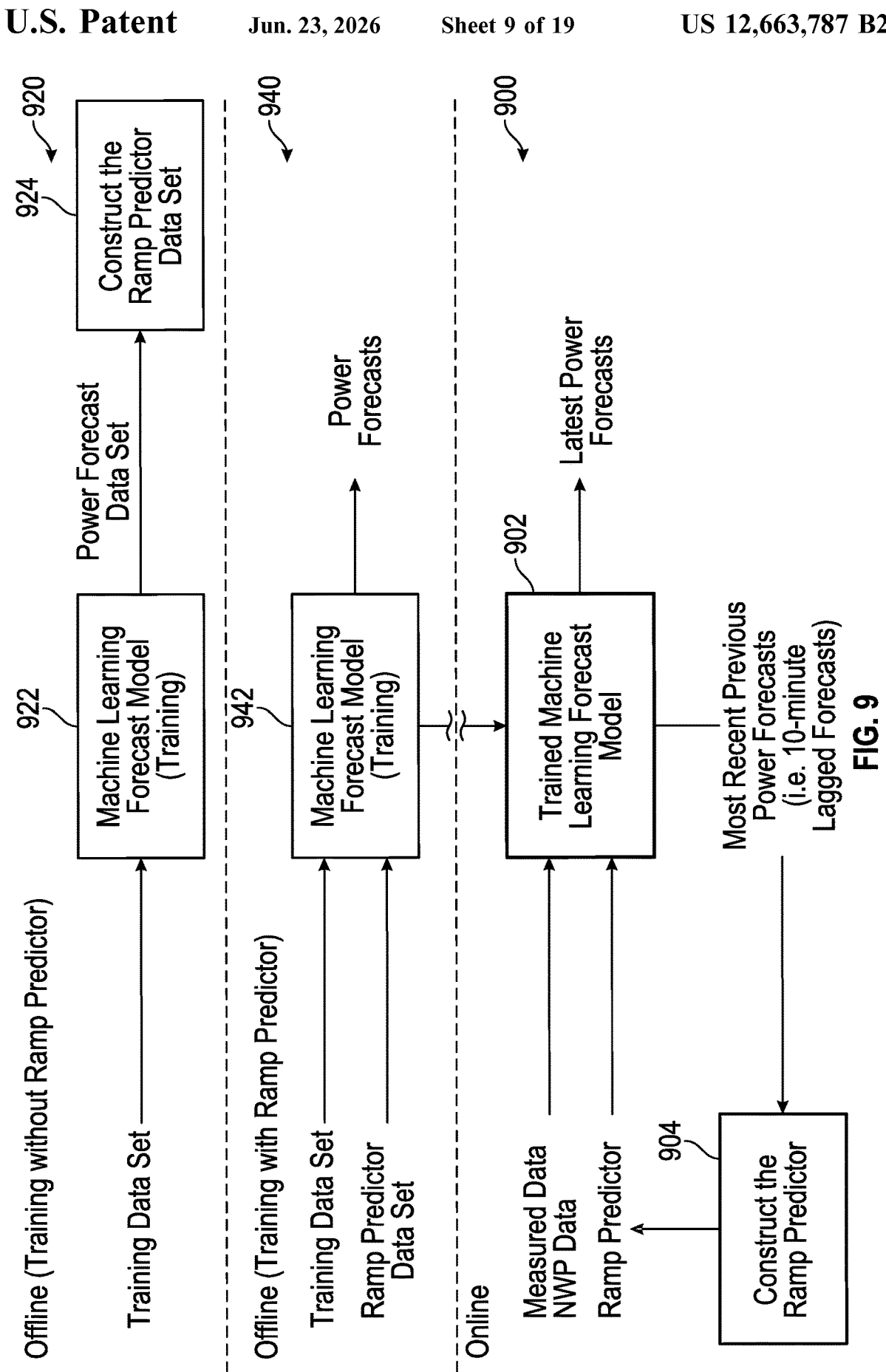
FIG. 9 depicts a process for online forecasting using a machine learning forecast model and processes for offline training of the machine learning forecast model in some embodiments.

FIG. 9 depicts a method 900 for online forecasting using a trained machine learning forecast model, a method 920 for offline training of the machine learning forecast model without ramp predictors, and a method 940 for offline training of the machine learning forecast model with ramp predictors in some embodiments. The variable power generation forecast system 104 performs the method 900. The method 900 begins at a block 902 where the power forecasting module 210 receives first data, which includes first generated power measurements for one or more of the variable power generation assets 112 and first weather forecast data for a geographic area that includes the one or more of the variable power generation assets 112 (for example, Numerical Weather Prediction (NWP) data), and which may include additional first data and/or first metadata for the one or more variable power generation assets 112 (for example, wind turbine capacity rating). The first generated power measurements may include a first reference generated power measurement that may have been measured generally at or just prior to a time the power forecasting module 210 generates power forecasts, and one or more first generated power measurements prior to the reference generated power measurement.

Also at the block 902, the power forecasting module 210 applies at a first time a trained machine learning forecast model to all or a portion of the received first data to obtain first power forecasts for a first set of look-ahead times for one or more variable power generation assets. Like the method 300 of FIG. 3, the first set of look-ahead times may include look-ahead times from approximately 10 minutes from a time of forecast to approximately six hours from the time of forecast. There may be look-ahead times within the set of look-ahead times every period of time (for example, every 10 minutes) or the period of time may vary (for example, may change from every 10 minutes to every 30 minutes). Those of skill in the art will understand that the set of look-ahead times may include any number of look-ahead times within a future period of time following the time of forecast.

At a block 904 the ramp predictor generation module 206 generates first ramp predictors for a second set of look-ahead times using the first power forecasts and second generated power measurements for one or more of the variable power generation assets 112. The ramp predictor generation module 206 may generate the first ramp predictors as described with reference to, for example, block 306 of FIG. 3 and FIGS. 4 and 5. The ramp predictor generation module 206 has to generate the first ramp predictors using the first power forecasts, which are lagged forecasts (for example, by 10 minutes), because the first ramp predictors will be used to generate second power forecasts.

The method 300 continues at the block 902 where the power forecasting module 210 receives second data, which includes the second generated power measurements, second weather forecast data for the geographic area, and the first ramp predictors, and which may include additional second data and/or second metadata for the one or more of the variable power generation assets 112 (for example, wind turbine capacity rating). The second data may also include first forecast errors for the first power forecasts that are calculated based on the first generated power measurements and the first power forecasts. The power forecasting module 210 applies at a second time, which is subsequent to the first time, the trained machine learning forecast model to all or a portion of the received second data to obtain second power forecasts for a second set of look-ahead times for the one or more of the variable power generation assets 112.

The variable power generation forecast system 104 may perform the method 900 periodically, such as every 10 minutes, to generate power forecasts for the one or more of the variable power generation assets 112. One advantage of the method 900 is that the method 900 utilizes low latency generated power measurements from various sensors at the variable power generation assets 112. The low latency of this data allows the variable power generation forecast system 104 to generate the ramp predictors for use in generating power forecasts. Although the variable power generation forecast system 104 uses lagged power forecasts (for example, lagged by 10 minutes) to generate the ramp predictors, the lagged power forecasts are sufficiently close in time to subsequent power forecasts that the ramp predictors provide measurable improvements to the accuracy of the subsequent power forecasts.

FIG. 9 also depicts the method 920 for offline training of the machine learning forecast model without ramp predictors. The variable power generation forecast system 104 performs the method 920. The method 920 begins at a block 922 where the training and curation module 208 receives a training data set for use in training a precursor machine learning forecast model. The training data set may be the same as or generally similar to the training data set described with respect to the block 352 of FIG. 3. The training and curation module 208 uses the training data set to train the precursor machine learning forecast model. Also at the block 922, the data set generation module 204 generates a power forecast data set. The data set generation module 204 may use the precursor machine learning forecast model to generate the power forecast data set. The power forecast data set may be the same as or generally similar to the power forecast data set described with respect to the block 354 of FIG. 3. At a block 924 the data set generation module 204 generates a ramp predictor data set. The ramp predictor data set may be the same as or generally similar to the ramp predictor data set described with respect to the block 356 of FIG. 3.

FIG. 9 also depicts the method 940 for offline training of the machine learning forecast model with the ramp predictor data set generated in the method 920. The variable power generation forecast system 104 performs the method 940. The process begins at a block 942 where the training and curation module 208 receives the training data set received in the block 922 of the method 920 and the ramp predictor data set generated in the block 924 of the method 920. The training and curation module 208 uses the training data set and the ramp predictor data set to train a machine learning forecast model. After the machine learning forecast model has been trained, the power forecasting module 210 may utilize the machine learning forecast model to generate power forecasts in the method 900 of FIG. 9.

Wind (or solar) power generation at geographically separated sites may exhibit significant spatiotemporal correlation. In order to take advantage of the spatiotemporal correlation, some embodiments described herein utilize measurements of power generation at nearby sites to improve the accuracy of a power forecast at a target site. In one example, improvements in forecast accuracy are achieved by selecting renewable energy farms near the target renewable energy farm and taking into account corresponding power measurement lags. A measurement lag is the difference between a measurement time and time of forecast.

The selection of renewable energy farms near the target renewable energy farm may be static or dynamic. In some embodiments, if selection of the renewable energy farm is static, the selections may be optimized for average conditions over the length of the training data set.

In other embodiments, the selection of the renewable energy farm near the target renewable energy farm is dynamic. Dynamic selection of nearby renewable energy farms may be based, at least in part, on changing weather conditions. For example, dynamic selection of nearby renewable energy farms may be made based on direction and speed of moving weather fronts.

Some embodiments described herein, describe systems and methods for constructing and utilize a dynamic predictor (e.g., neighborhood ramp predictor or RP2). The dynamic predictor may, in some embodiments, be added to predictors of an established machine learning forecast model to improve the accuracy of power forecasts. The construction of the dynamic predictor may utilize knowledge of the geographic locations of the renewable energy farms (e.g., sites) and recent measurements of available power from each site.

In various embodiments, the construction of dynamic predictor is dynamic; the selection of nearby sites and selection of lagged measurements from each selected site vary in time. However, the form of the dynamic predictor may be fixed, and the rules used to construct values of the dynamic predictor may be unchanging throughout training and operation of the forecast model.

Figure 10:
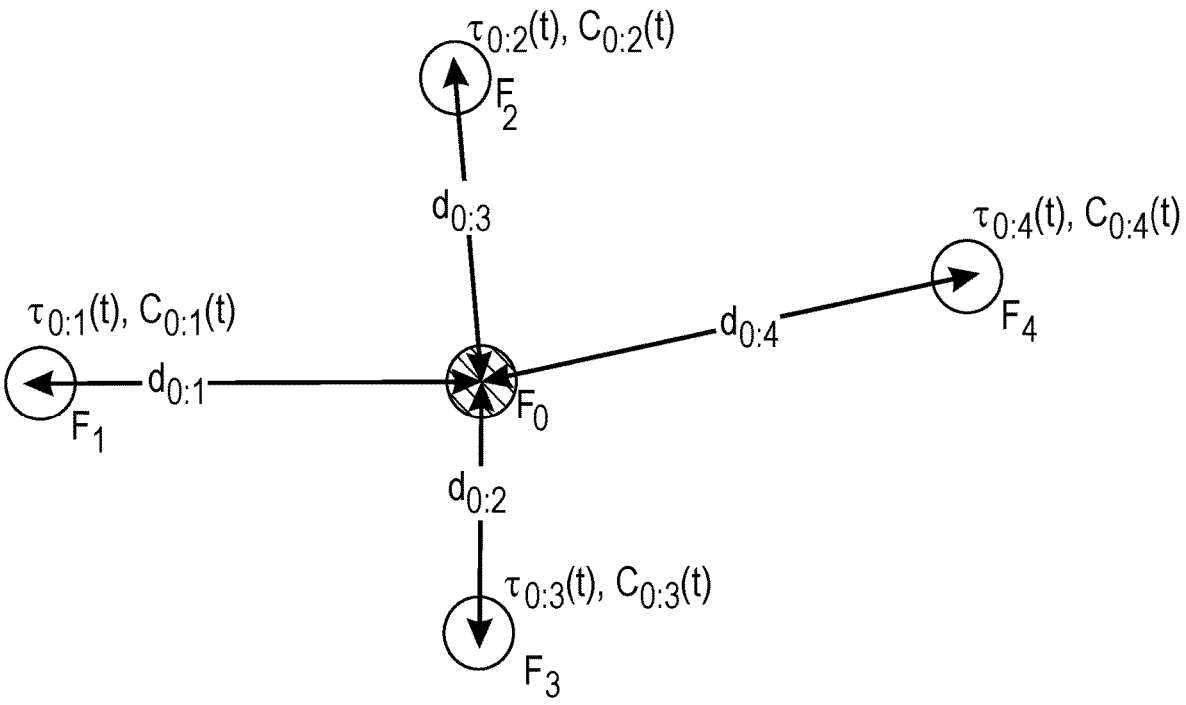
FIG. 10 depicts a wind or solar generation site, $F_0$, with similar nearby sites, $F_n$, characterized by their cross-correlation lags, $t_{0:n}(t)$, and corresponding maximum correlation coefficients, $C_{0:n}(t)$ in some embodiments.

The following is a high-level description of the dynamic predictor in some embodiments. FIG. 10 depicts a wind or solar generation site, $F_0$, with similar nearby sites, $F_n$., characterized by their cross-correlation lags, $\tau_{0:n}(t)$, and corresponding maximum correlation coefficients, $C_{0:n}(t)$ in some embodiments.

With regard to FIG. 10, $F_0$, is an intermittent power generation site (e.g., a renewable energy site referred to herein as the target site) separated by distances, $d_{0:1}, \ldots d_{0:N}$ from nearby sites, $F_1, \ldots F_N$. The nearby sites (e.g., neighborhood sites) may be or include a geographic location of one or more sensors and/or renewable energy sites (e.g., wind farms if the target site is a wind farm, or solar farms if the target set is a solar farm). The sites may be geographically proximate to the target site. In some embodiments, to be geographically proximate may be based on the correlation between the target site and another site (e.g., if uncorrelated or if the two sites are insufficiently correlated as discussed herein, then the two sites may not be considered to be "neighboring" for the purposes of collecting information for ramp prediction). In some embodiments, a site may be considered neighboring if within a distance threshold of another site and/or geographic features (e.g., mountains) do not isolate the sites from each other.

Returning to FIG. 10, from the N+1 time series of measurements of normalized available power at the sites, the variable power generation forecast system 1100 may determine $\tau_{0:n}(t)$, the lag between target site, $F_0$, and nearby site, $F_n$, for which their respective power measurements may be maximally correlated with correlation coefficient $C_{0:n}(t)$. In some embodiments, the variable power generation forecast system 1100 may generate a cross-correlation matrix to assist in determining the lag between the target site and one or more nearby sites.

The sign convention may be arbitrarily chosen as:

$\tau_{0:n}(t) > 0$ when generation at $F_n$ leads generation at $F_0$, $\tau_{0:n}(t) < 0$ when generation at $F_n$ lags generation at $F_0$.

$C_{0:n}(t)$ will typically be bounded between 0 (no correlation) and 1 (perfect correlation), although negative values (anti-correlation) are possible. For the following example, it will be appreciated that $t_{0:n}(t)$ and $C_{0:n}(t)$ are determined from time series of limited duration, and as a result may vary significantly in time as correlation between sites changes with the weather. As follows, as shown in FIG. 10, each site, $F_n$, near a forecast target site, $F_0$, may be characterized by two time-dependent variables, $\tau_{0:n}(t)$ and $C_{0:n}(t)$.

The time variation of $\tau_{0:n}(t)$ and $C_{0:n}(t)$ can be understood in terms of a simple intuitive picture of the weather. For example, $\tau_{0:n}(t)$ may be understood as measuring the time for an advancing weather front to move from $F_n$ to $F_0$ or from $F_0$ to $F_n$. In this example, $\tau_{0:n}(t)$ is positive when $F_n$ is upwind of $F_0$ and thus sampling the advancing weather front ahead of $F_0$. $C_{0:n}(t)$ is expected to be small when $d_{0:n}$ is hundreds of kilometers and to approach unity when $d_{0:n}$ is just a few kilometers.

Some embodiments described herein, however, do not depend on (or use) meteorological measurements, weather models, or other knowledge of the underlying weather dynamics of nearby sites (i.e., sites nearby to the target site). In one example, only time-lagged measurements of available power from geographically distributed generation sites and spatiotemporal correlations in power generation characterized by $\tau_{0:n}(t)$ and $C_{0:n}(t)$ derived from these measurements are utilized.

For a target site with N nearby sites, embodiments disclosed herein include rules for constructing a neighborhood ramp predictor (e.g., RP2) which can be added to the predictors of an established machine learning forecast model to improve the accuracy of power forecasts. In some embodiments, the construction of the ramp predictor requires only knowledge of the geographic locations of the sites and recent measurements of available power from each site. In one example, at time of forecast with timestamp, k, the values of $\tau_{0:n}(k)$ and $C_{0:n}(k)$ for n=1, 2, . . . , N are calculated from the recent power measurements and then used to select measurements from the N nearby sites to determine the values of the ramp predictor. As a result, the predictor's values at time of forecast reflect the latest known correlations in power generation between the various sites, which reflect the recent underlying weather conditions.

In some embodiments, the form of the RP2 predictor and the rules for its construction are fixed during training and subsequent operation of the forecast model. As a result, the RP2 predictor(s) can be added to the predictors of an established forecast model without otherwise changing or complicating the forecast model.

It will be appreciated that the RP2 predictors may be utilized in place of the ramp predictors discussed with regard to FIGS. 3 and 9. In some embodiments, the RP2 predictors may be used in addition to the ramp predictors discussed with regard to FIGS. 3 and 9 to provide further accuracy improvements.

Figure 11:
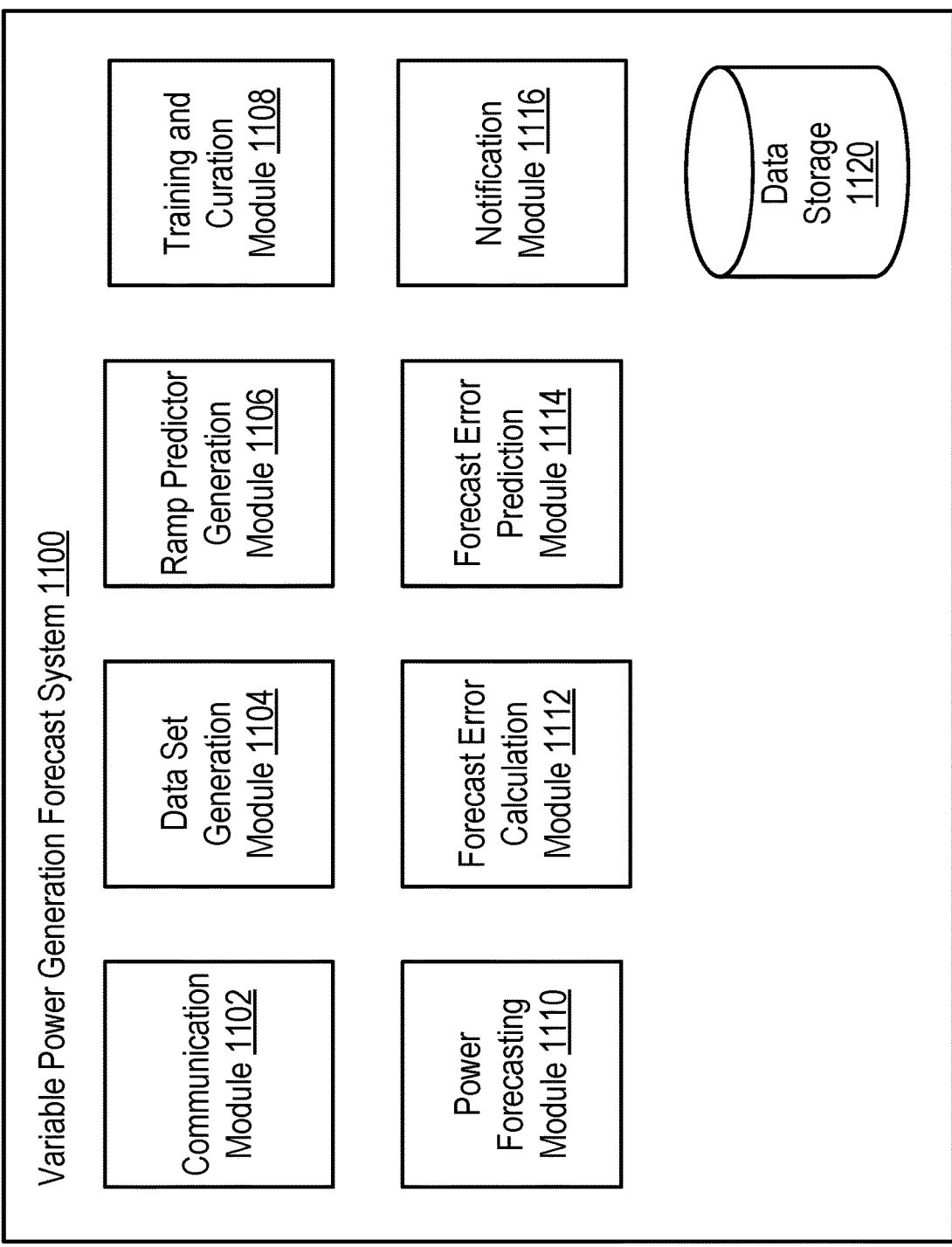
FIG. 11 depicts a block diagram of a variable power generation forecast system in some embodiments.

FIG. 11 depicts a block diagram of a variable power generation forecast system 1100 in some embodiments. The variable power generation forecast system 1100 may be similar to the power generation forecast system 104 depicted in FIGS. 1 and 2. The difference between the power generation forecast system 104 and the variable power generation forecast system 1100 is that the variable power generation forecast system 1100 includes a ramp predictor generation module 1106 that performs the neighborhood ramp predictor instead of or in addition to the ramp predictor described with respect to FIGS. 2-5 and 9.

The variable power generation forecast system 1100 includes a communication module 1102, a data set generation module 1104, a ramp predictor generation module 1106, a training and curation module 1108, a power forecasting module 1110, a forecast error calculation module 1112, a forecast error prediction module 1114, a notification module 1116, and a data storage 1120.

The communication module 1102 may send and/or receive requests and/or data between the variable power generation forecast system 104 and any of the power system 106, the operations system 120, the electrical network 102, and/or other neighborhood sites. The communication module 1102 may receive requests and/or data from the power system 106, the weather service system 118, the operations system 120 and/or the electrical network 102. The communication module 1102 may also send requests and/or data to the power system 106, the weather service system 118, the operations system 120 and/or the electrical network 102. The communication module 1102 may be the same as or perform similar functions as the communication module 202.

In some embodiments, the communication module 1102 may assist with the determination of lag and correlation coefficients between sites (e.g., a target renewable energy site and one or more neighborhood renewable energy sites).

The data set generation module 1104 may generate various data sets for use in training machine learning forecast models and/or accuracy booster models. The data set generation module 1104 may be the same as or perform similar functions as the data set generation module 204.

The ramp predictor generation module 1106 may generate ramp predictors for a set of look-ahead times. The ramp predictor generation module 1106 may generate one ramp predictor for each look-ahead time of the set of look-ahead times based in part on information from one or more renewable energy sites that are proximate to a target renewable energy site. The ramp predictor generation module 1106 may be the same as or perform similar functions as the ramp predictor generation module 206.

The training and curation module 1108 may train artificial intelligence and/or machine learning systems (for example, neural networks, multiple sets of decision trees) to be applied to various types of data (for example, power measurement data, weather forecast data, ramp predictors, last known forecast errors) to generate forecasts and/or predictions (for example, power forecasts, power forecast errors). The training and curation module 1108 may be the same as or perform similar functions as the training and curation module 208.

The power forecasting module 1110 may apply artificial intelligence and/or machine learning systems to various types of data (for example, power measurement data, weather forecast data, ramp predictors, last known forecast errors) to generate forecasts and/or predictions (for example, power forecasts, power forecast errors). The power forecasting module 1110 may be the same as or perform similar functions as the power forecasting module 210.

The forecast error calculation module 1112 may calculate forecast errors in power forecasts generated by the power forecasting module 1110 (and/or the power forecasting module 210). The forecast error calculation module 1112 may be the same as or perform similar functions as the forecast error calculation module 212.

The forecast error prediction module 1114 may apply artificial intelligence and/or machine learning systems to data, such as ramp predictors and forecast errors, to generate predicted forecast errors in power forecasts. The forecast error prediction module 1114 may be the same as or perform similar functions as the forecast error prediction module 214.

The notification module 1116 may generate and provide notifications that include power forecasts generated by the power forecasting module 1110 (or the power forecasting module 210). The notification module 1116 may provide reports, alerts, and/or dashboards that include results, confidence scores, and/or other information. The notification module 1116 may be the same as or perform similar functions as the notification module 216.

The data storage 1120 may include data stored, accessed, and/or modified by any of the modules of the variable power generation forecast system 104, such as the machine learning forecast models and the accuracy booster models described herein. The data storage 1120 may include any number of data storage structures such as tables, databases, lists, and/or the like. The data storage 1120 may be the same as or perform similar functions as the data storage 220.

The ramp predictor generation module 1106 may determine a correlation between two sites. In one example, the ramp predictor generation module 1106 determines $\tau_{0:n}(t)$ (the lag between target site, $F_0$, and nearby site, $F_n$, for which their respective power measurements may be maximally correlated with correlation coefficient $C_{0:n}(t)$.

Figure 12A:
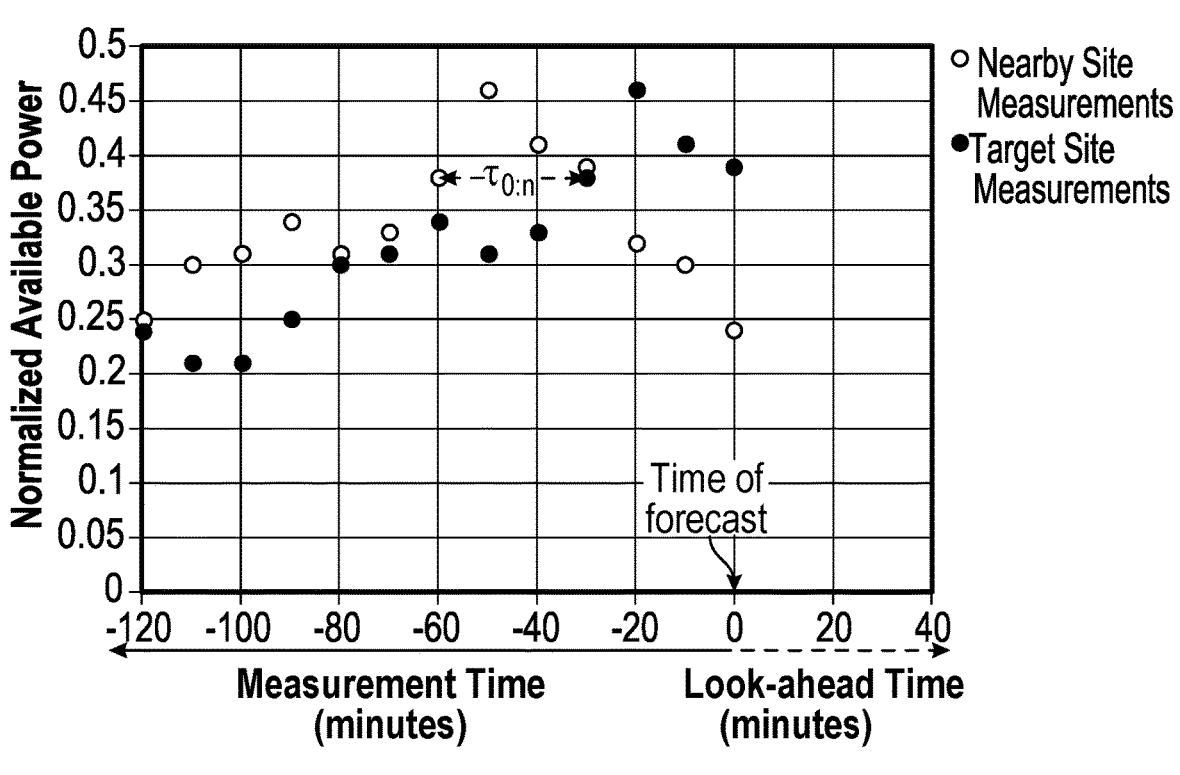
FIG. 12A depicts two perfectly correlated ($C_{0:n}(t)=1$) measurement series in one example.

FIG. 12A depicts two perfectly correlated $(C_{0:n}(t)=1)$ measurement series in one example. In FIG. 12A, measurements of available power at a nearby site, $F_n$ (unfilled dots) lead those at a target site, $F_0$, (filled dots) by the time interval of maximum cross-correlation, $\tau_{0:n}$. In this example, the measurement interval is 10 minutes, so that 13 measurements are included in the measurement time window starting at minus 120 minutes and ending at 0 minutes. Correlation analysis (or visual inspection in this simple example) finds $\tau_{0:n}(t)$, 30 minutes. In general, $\tau_{0:n}(t)$ will be well-defined if the number of measurement intervals (12 in FIG. 12A) is significantly longer than the number of intervals spanned by $\tau_{0:n}(t)$ (3 in FIG. 12A), and $C_{0:n}(t)$ is large enough under the prevailing conditions that the value of $\tau_{0:n}(t)$ is not strongly affected by the inevitable "noise" in the measurement series.

The form of the ramp predictor and the rules for construction of the ramp predictor may be fixed during training and subsequent operation of the forecast model. Therefore, in some embodiments, this ramp predictor can be added to the predictors of an established forecast model without otherwise changing or complicating the forecast model (e.g., such as the ramp predictor discussed with regard to FIGS. 3 and 9).

Although it is desirable to update $\tau_{0:n}(t)$ and $C_{0:n}(t)$ with each new forecast time stamp, the degree to which these derived values can follow rapid changes in the underlying weather is limited by the measurement interval and the number of successive measurements needed to calculate the cross-correlation. In some embodiments, the RP2 predictors may be most effective when the $\tau_{0:n}(t)$ and $C_{0:n}(t)$ change slowly on the timescale of the measurement time series required to determine $\tau_{0:n}(t)$.

For notational convenience, the explicit expression of the time dependence of $\tau_{0:n}(t)$ and $C_{0:n}(t)$ is omitted herein.

Figure 12B:
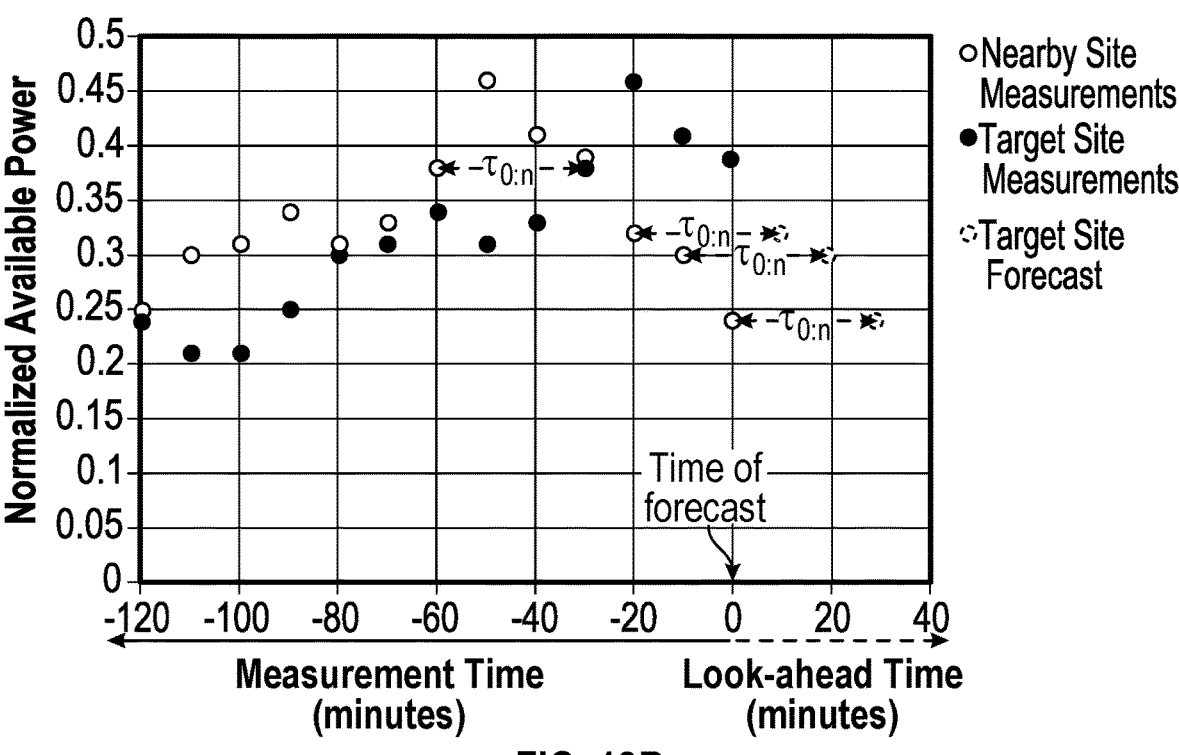
FIG. 12B is a normalized available power graph that depicts continued correlation after the time of forecast in an example.

FIG. 12B is a normalized available power graph that depicts continued correlation after the time of forecast in an example. If the observed correlation continues after the time of forecast, the most recent measurements at the nearby site constitute forecasts for available power at the target site. The nearby site measurements are identified as unfilled dots, the target site measurements are identified as filled dots, and the target site forecast is identified as dots circumscribed with a dotted line.

Figure 12C:
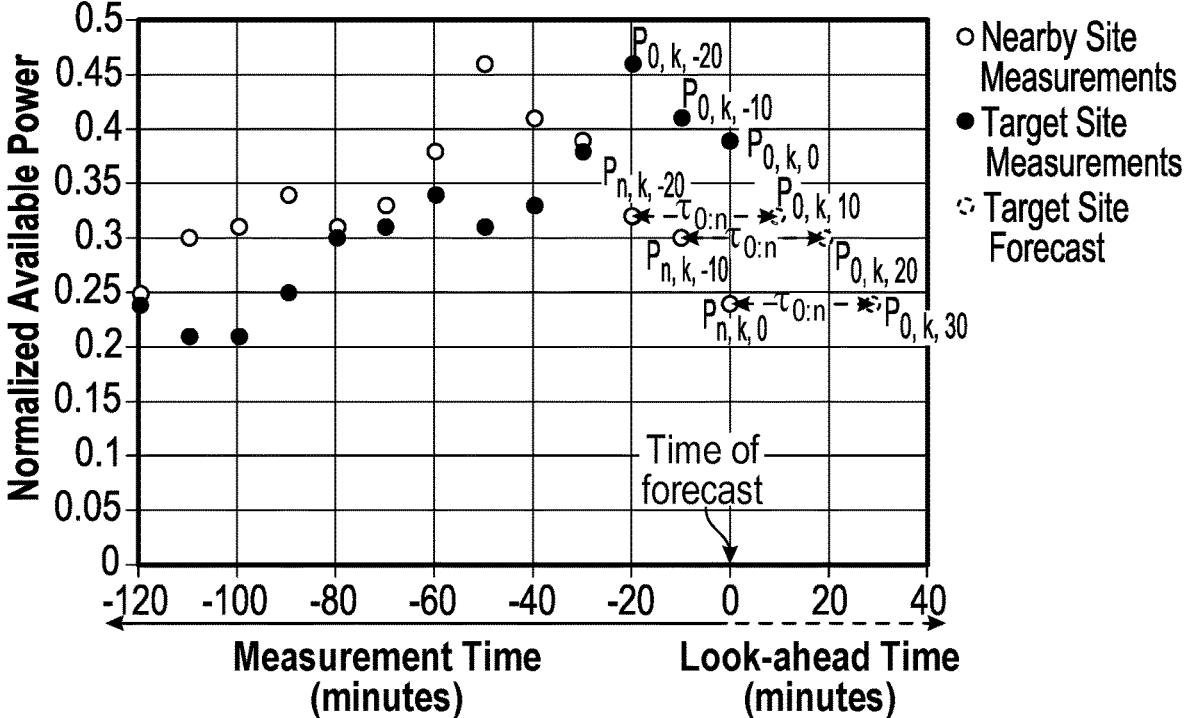
FIG. 12C is a normalized available power graph that includes labels for indexing the power measurements and inferred forecasts used to construct the RP2 predictors in some embodiments.

FIG. 12C is a normalized available power graph that includes labels for indexing the power measurements and inferred forecasts used to construct the RP2 predictors in some embodiments. Similar to FIG. 12B, the nearby site measurements are identified as unfilled dots, the target site measurements are identified as filled dots, and the target site forecast is identified as dots circumscribed with a dotted line.

The ramp predictor generation module 1106 may construct RP2 predictors for a target site based on one or more neighboring sites. If, as illustrated in FIG. 12A, power generation at a nearby site leads generation at the target site by 30 minutes, then, as shown in FIG. 12B, a 20-minute lagged power measurement at the nearby site is a forecast for the power that will be produced by the target site 10 minutes after time of forecast, or simply stated, a 10-minute look-ahead forecast. Similarly, a 10-minute lagged power measurement at the nearby site is a 20-minute look-ahead forecast for the target site, and a 0-minute lagged power measurement at the nearby site is a 30-minute lookahead forecast for the target site.

The above example is readily generalized. Let l be the correlation-based forecast look-ahead time relative to the time of forecast. Let m≤0 be the lagged measurement time relative to time of forecast. In some embodiments, the relationship between l and m is simply:

$$l=m+\tau_{0:n} \tag{5}$$

In other words, the correlation-based forecast look-ahead time relative to the time of forecast is equal to the sum of the lagged measurement time relative to the time of forecast and the lag between target site, $F_0$, and nearby site, $F_n$, for which their respective power measurements are maximally correlated with correlation coefficient $C_{0:n}(t)$.

Since $l > 0$ by definition, and $m \leq 0$ by definition, it follows immediately from equation 1 that $$0 \leq |m| < \tau_{0:n}, \tag{6}$$

and $$0 < l \leq \tau_{0:n}. \tag{7}$$

Thus, at site, n, at time of forecast, k, the series of lagged power measurements, $P_{n,k,m}$, where each lag, m, satisfies equation 6, constitutes a series of correlation-based forecasts for power generation at the target farm. Using equation 5, we can index this series as $P_{0,k,l}$, at forecast look-ahead times, l, satisfying equation 7. Furthermore, we can, without loss of information, drop the O subscript and label the series as $P_{k,l}$. This relabeling highlights the formal identity between this series of correlation-based power forecasts and the series of power forecasts used to construct the ramp predictor.

Furthermore, the series of values created by joining the most recent power measurements from the target site and this series of correlation-based power forecasts for the target site, may be formally identical to the series used in the construction of the "ramp predictor" disclosed herein.

Thus $R2_{n,k,l}$, a predictor incorporating correlation-based forecasts from nearby site, n, for forecast timestamp, k, and forecast look-ahead, l, can be written as, $$R2_{n,k,l} = [\Delta P_{k,1}, \ldots \Delta P_{k,f}, \ldots \Delta P_{k,F}], \tag{8}$$

where $\Delta P_{k,f}$ is the difference between the measured power or the correlation-based forecast power at time index, f, and the measured power, $P_{k,0}$, at the current timestamp, k, given by $$\Delta P_{k,f} = P_{k,f} - P_{k,0} \tag{9}$$

The time associated with the first value in the series (f=1) precedes or equals the lookahead time, l, while the time associated with the last value in the series (f=F) equals or follows l. These "start" and "stop" times and the number of values, F, used to construct the series are optimized empirically and may vary for each forecast look-ahead time.

Figure 13:
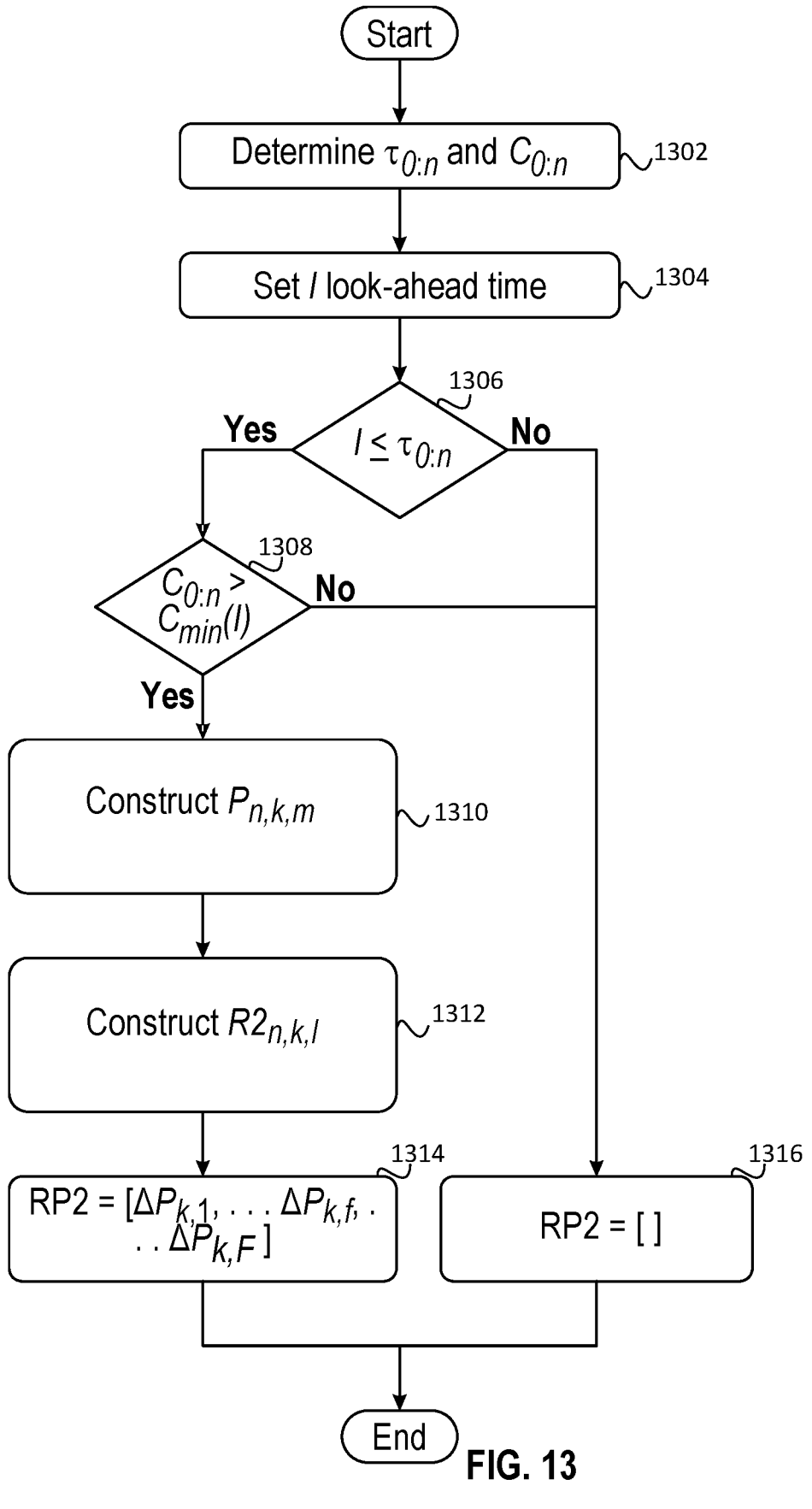
FIG. 13 depicts a flowchart for construction of an RP2 ramp predictor using a single site in some embodiments.

FIG. 13 depicts a flowchart for construction of an RP2 ramp predictor using a single site in some embodiments. In step 1302, at time of forecast, k, the ramp predictor generation module 1106 determines $\tau_{0:n}$ and $C_{0:n}$ by correlation analysis. As discussed herein, $\tau_{0:n}$ is the lag between target site, $F_0$, and nearby site, $F_n$, for which their respective power measurements are maximally correlated with correlation coefficient Corn (which may change due to weather). For example, the ramp predictor generation module 1106 may analyze changing weather conditions to determine the lag between the two sites as well as the correlation between the two sites.

In step 1304, the ramp predictor generation module 1106 sets 1 to the desired forecast look-ahead time. It will be appreciated that the ramp predictor generation module 1106 may perform steps 1304-1314 for any number of forecast look-ahead times.

In step 1306, the ramp predictor generation module 1106 determines if the selected forecast look-ahead time (l) is less than or equal to the lag between target site, $F_0$, and nearby site, $F_n$, for which their respective power measurements are maximally correlated with correlation coefficient $C_{0:n}$ referred to as $\tau_{0:n}$. If l is less than or equal to $\tau_{0:n}$, then the method proceeds to step 1308. Otherwise, the method proceeds to step 1316 where no ramp predictor is generated (or the set of ramp predictors is null).

In step 1308, the ramp predictor generation module 1106 optionally determines if $C_{0:n} > Cmin(l)$. For example, the ramp predictor generation module 1106 may determine if the correlation coefficient between the two sites is greater than a minimum correlation coefficient for the particular lag time (l) (e.g., if the correlation coefficient is greater than a threshold). In some embodiments, the ramp predictor generation module 1106 may determine a minimum correlation coefficient between two sites for different lag times based on historical data (e.g., experienced weather at certain times at the two different sites).

If $C_{0:n} > Cmin(l)$ then the flowchart continues to step 1310. If $C_{0:n}$ is less than or equal to Cmin(l), then the method proceeds to step 1316 where no ramp predictor is generated (or the set of ramp predictors is null). In some embodiments, the flowchart may continue to step 1310 if Corn is greater than or equal to Cmin(l).

In step 1310, the ramp predictor generation module 1106 constructs a series of lagged power measurements, $P_{n,k,m}$ where n is the site, k is the time of forecast, and m is lagged measurement time relative to the time of forecast. In various embodiments, m must satisfy equation 6 for each of the lagged power measurements.

In step 1312, the ramp predictor generation module 1106 constructs the ramp predictors $R2_{n,k,l}$ according to equations 8 and 9 and the empirically determined start and stop times for the series. For example, $R2_{n,k,l}$ may include a series of $\Delta P_{k,f}$ (e.g., the difference between the measured power or the correlation-based forecast power at time index, f, and the measured power, $P_{k,0}$, at the current timestamp, k, given by $\Delta P_{k,f} = P_{k,f} - P_{k,0}$).

In step 1314, the ramp predictor generation module 1106 may generate a set of ramp predictors for $R2_{n,k,l}$ including a series of $\Delta P_{k,f}$ (e.g., the difference between the measured power or the correlation-based forecast power at time index, f, and the measured power, $P_{k,0}$, at the current timestamp, k, given by $\Delta P_{k,f} = P_{k,f} - P_{k,0}$).

The method then ends. In various embodiments, the ramp predictors $R2_{n,k,l}$ based on historical data are used with a data set of forecast errors to assist in training accuracy booster models (e.g., offline). Similarly, the ramp predictors $R2_{n,k,l}$ based on current data may be used with last known forecast errors associated with power forecasts to generate predicted forecast errors and improve power forecasts for one or more (e.g., each) look-ahead.

Figure 14:
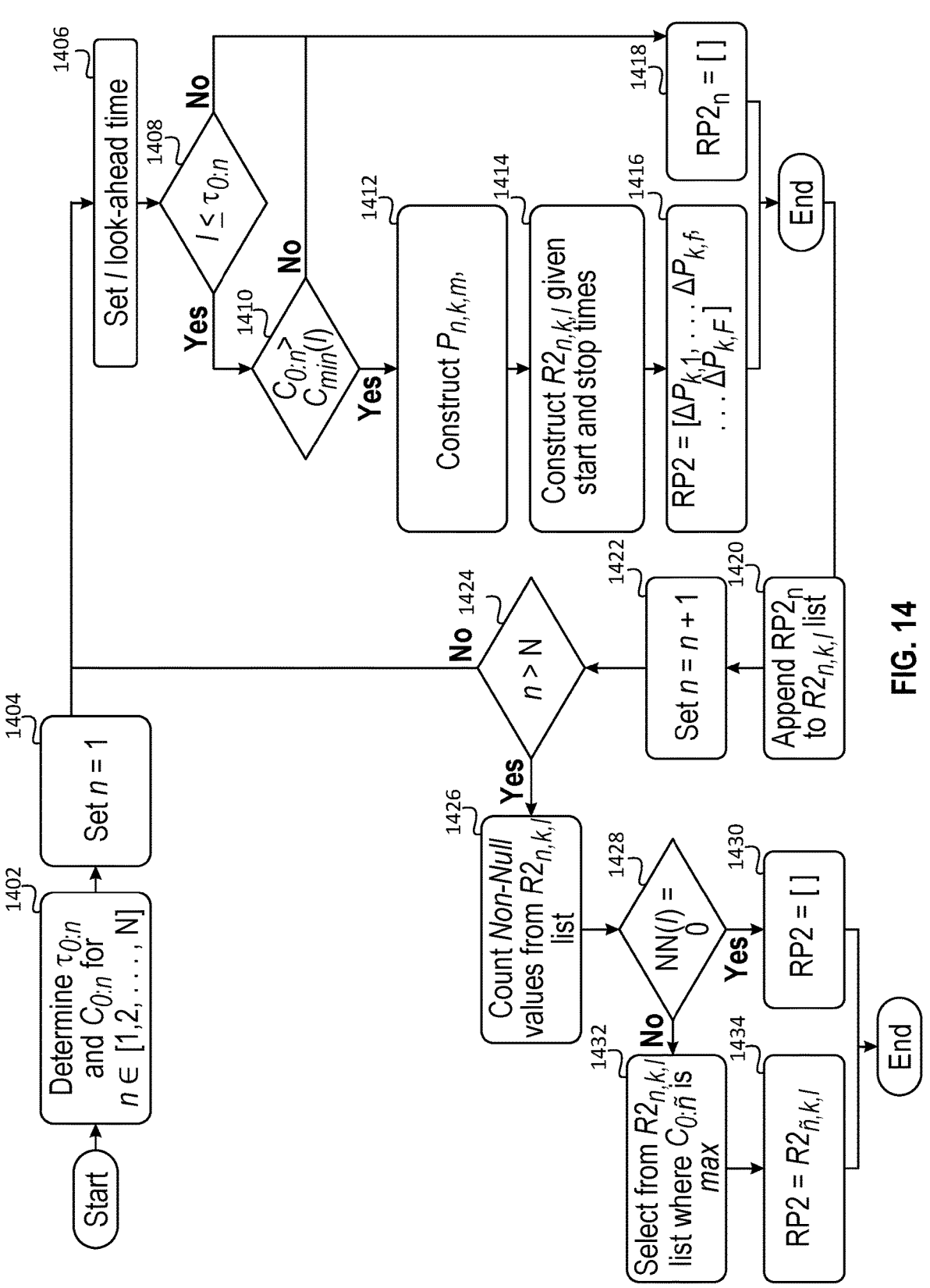
FIG. 14 depicts a flowchart for construction of an RP2 ramp predictor using several sites in some embodiments.

FIG. 14 depicts a flowchart for construction of an RP2 ramp predictor using several sites in some embodiments. The procedure depicted in FIG. 13 constructs RP2 for a target site based on lagged power measurements from a single nearby site. To construct RP2 based on lagged power measurements from an arbitrary number, N, of nearby sites, the procedure can be repeated for each nearby site. The result, for forecast timestamp, k, for a specified forecast look-ahead, l, is the set of series, $R2_{n,k,l}$, that can be constructed from lagged power measurements at each nearby site, n, where n=1, . . . , N.

Depending on the spatial distribution of nearby sites and weather conditions at time of forecast, the number of series that can be constructed for each lookahead time can vary from 0 to N. When that number is 2 or greater, the series corresponding to the most positive correlation coefficient may be chosen.

In some embodiments, the ramp predictor generation module 1106 averages the values of the two or more contributing series, weighted by a function of their respective correlation coefficients. Another alternative would be to treat all series with correlation coefficients above a minimum threshold as separate predictors for the forecast model.

Returning to FIG. 14, in step 1402, the ramp predictor generation module 1106 determines $\tau_{0:n}$ and $C_{0:n}$ by correlation analysis for between the target site and each of the neighboring sites by correlation analysis. This process may be similar to step 1302 in FIG. 13 but between the target site and more than one neighborhood site (e.g., between the target site and a first neighborhood site, between the target site and a second neighborhood site, and so on).

In step 1404, the ramp predictor generation module 1106 sets n=1 to set up iterations. It will be appreciated that the process may be iterated in any number of ways.

In step 1406, the ramp predictor generation module 1106 sets l to the desired forecast look-ahead time. It will be appreciated that the ramp predictor generation module 1106 may perform steps 1408-1416 for any number of forecast look-ahead times.

In step 1408, the ramp predictor generation module 1106 determines if the selected forecast look-ahead time (l) is less than or equal to the lag between target site, $F_0$, and nearby site, $F_n$ (for the particular site n under consideration), for which their respective power measurements are maximally correlated with correlation coefficient $C_{0:n}(t)$ referred to as $\tau_{0:n}$. If l is less than or equal to $\tau_{0:n}$, then the method proceeds to step 1410. Otherwise, the method proceeds to step 1418 where no ramp predictor is generated (or the set of ramp predictors is null).

In step 1410, the ramp predictor generation module 1106 optionally determines if $C_{0:n}>$Cmin(l) between the target site and the neighborhood site n under consideration. For example, the ramp predictor generation module 1106 may determine if the correlation coefficient between the two sites is greater than a minimum correlation coefficient for the particular lag time (l) (e.g., if the correlation coefficient is greater than a threshold). In some embodiments, the ramp predictor generation module 1106 may determine a minimum correlation coefficient between two sites for different lag times based on historical data (e.g., experienced weather at certain times at the two different sites).

If $C_{0:n}>$Cmin(l) then the flowchart continues to step 1412. If $C_{0:n}$ is less than or equal to Cmin(l), then the method proceeds to step 1418 where no ramp predictor is generated (or the set of ramp predictors is null). In some embodiments, the flowchart may continue to step 1412 if Corn is greater than or equal to Cmin(l).

In step 1412, the ramp predictor generation module 1106 constructs a series of lagged power measurements, $P_{n,k,m}$ where n is the particular neighborhood site under consideration, k is the time of forecast, and m is lagged measurement time relative to the time of forecast. In various embodiments, m must satisfy equation 6 for each of the lagged power measurements.

In step 1414, the ramp predictor generation module 1106 constructs the ramp predictors $R2_{n,k,l}$ according to equations 8 and 9 and the empirically determined start and stop times for the series.

In step 1416, the ramp predictor generation module 1106 may generate a set of ramp predictors for $R2_{n,k,l}$ including a series of $\Delta P_{k,f}$ (e.g., the difference between the measured power or the correlation-based forecast power at time index, f, and the measured power, $P_{k,0}$, at the current timestamp, k, given by $\Delta P_{k,f}=P_{k,f}-P_{k,0}$).

The process for generating ramp predictors (RP2) between the target site and the particular neighborhood site (n) ends.

In step 1420, the particular set of ramp predictors between the target site and the particular neighborhood site (n) is appended to a master set of ramp predictors. The master set of ramp predictors may include the ramp predictors (RP2) generated for any number of different neighboring sites (e.g., repeating steps 1406-1418 for each site (n)).

In step 1422, the ramp predictor generation module 1106 increments n (e.g., n=n+1).

In step 1424, the ramp predictor generation module 1106 determines if n is greater than N (i.e., if all selected neighborhood sites have been considered by steps 1406-1418). If not all neighborhood sites are considered, steps 1406-1418 is repeated for the next neighborhood site. If all neighborhood sites are considered, the method continues to step 1426.

In step 1426, the ramp predictor generation module 1106 determines the number of non-null values of the master ramp predictor set. In step 1428, the ramp predictor generation module 1106 determines if the non-null values are equal to zero. In other words, the ramp predictor generation module 1106 determines if there are any non-null ramp predictors in the master set of ramp predictors. If there are no non-null ramp predictors, then a set of ramp predictors cannot be constructed from the lagged measurements of any of the N nearby sites.

If there are no non-null ramp predictors in the master set of ramp predictors, the ramp predictor generation module 1106 may optionally generate a set of ramp predictors equaling the null set in step 1430.

It will be appreciated that there are many ways the ramp predictor generation module 1106 may determine if the master ramp predictor set has any non-null values or has all null values (e.g., the process is not limited to steps 1426 and 1428).

If there are any non-null ramp predictors in the master set of ramp predictors, the method continues to step 1432.

In step 1432, the ramp predictor generation module 1106 selects ramp predictors from the master set of ramp predictors where $C_{0:n}$ is maximum (e.g., with the most positive correlation coefficient, $C_{0:n}$).

In step 1434, the ramp predictor generation module 1106 may provide the selected ramp predictors from the master set of ramp predictors.

In various embodiments, the selected ramp predictors from the master set of ramp predictors may be used with last known forecast errors associated with power forecasts to generate predicted forecast errors and improve power forecasts for one or more (e.g., each) look-ahead. In some embodiments, the selected ramp predictors from the master set of ramp predictors may be used for training.

Figure 15:
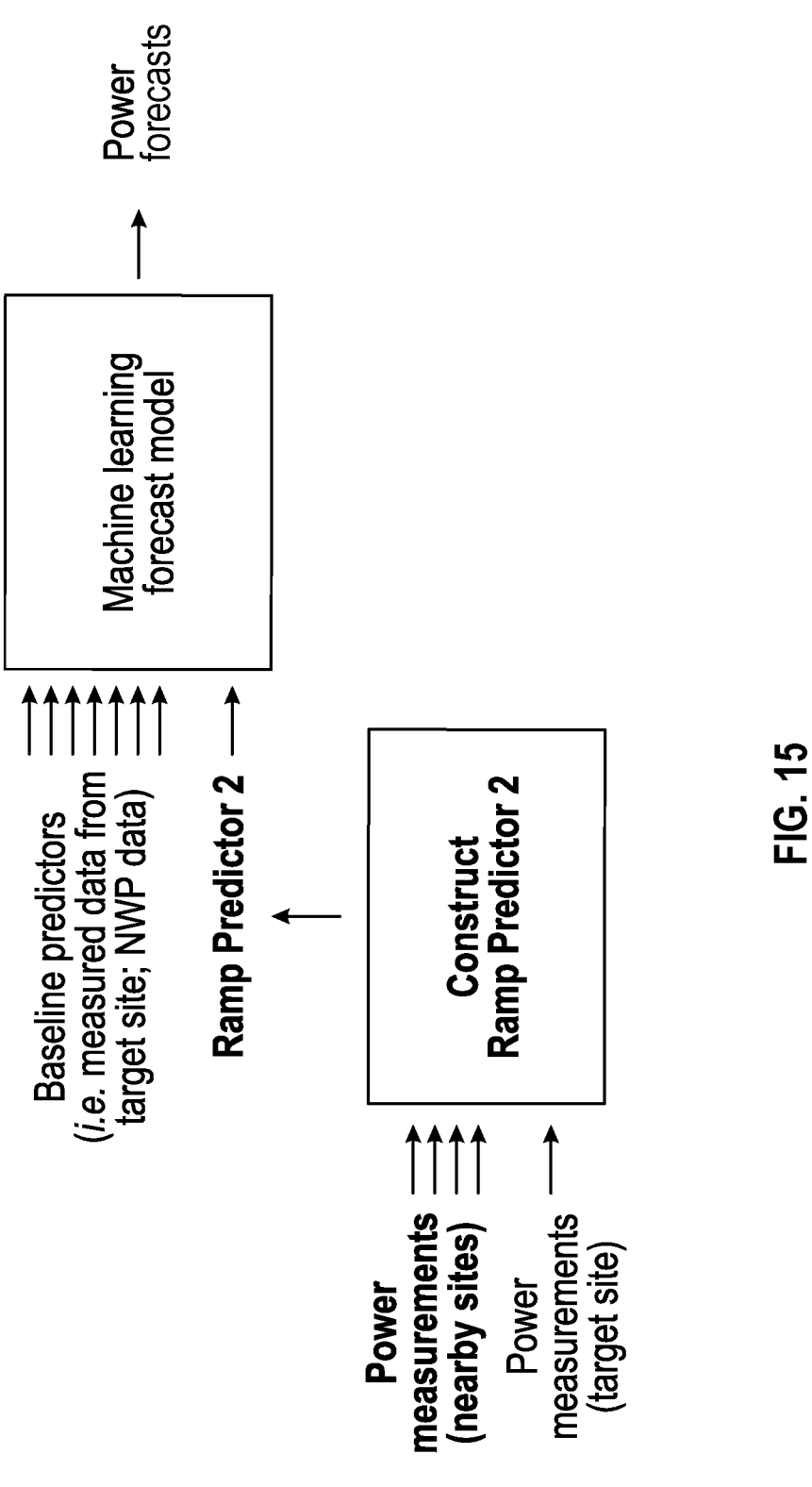
FIG. 15 depicts an online operation of a forecast module with RP2 predictors in some embodiments.

FIG. 15 depicts an online operation of a forecast module with RP2 predictors in some embodiments. If lagged power measurements from one or more neighboring sites are available at the time of forecast, the RP2 predictors may be built and fed into an established machine learning forecast model alongside the baseline predictors for that model.

Figure 16:
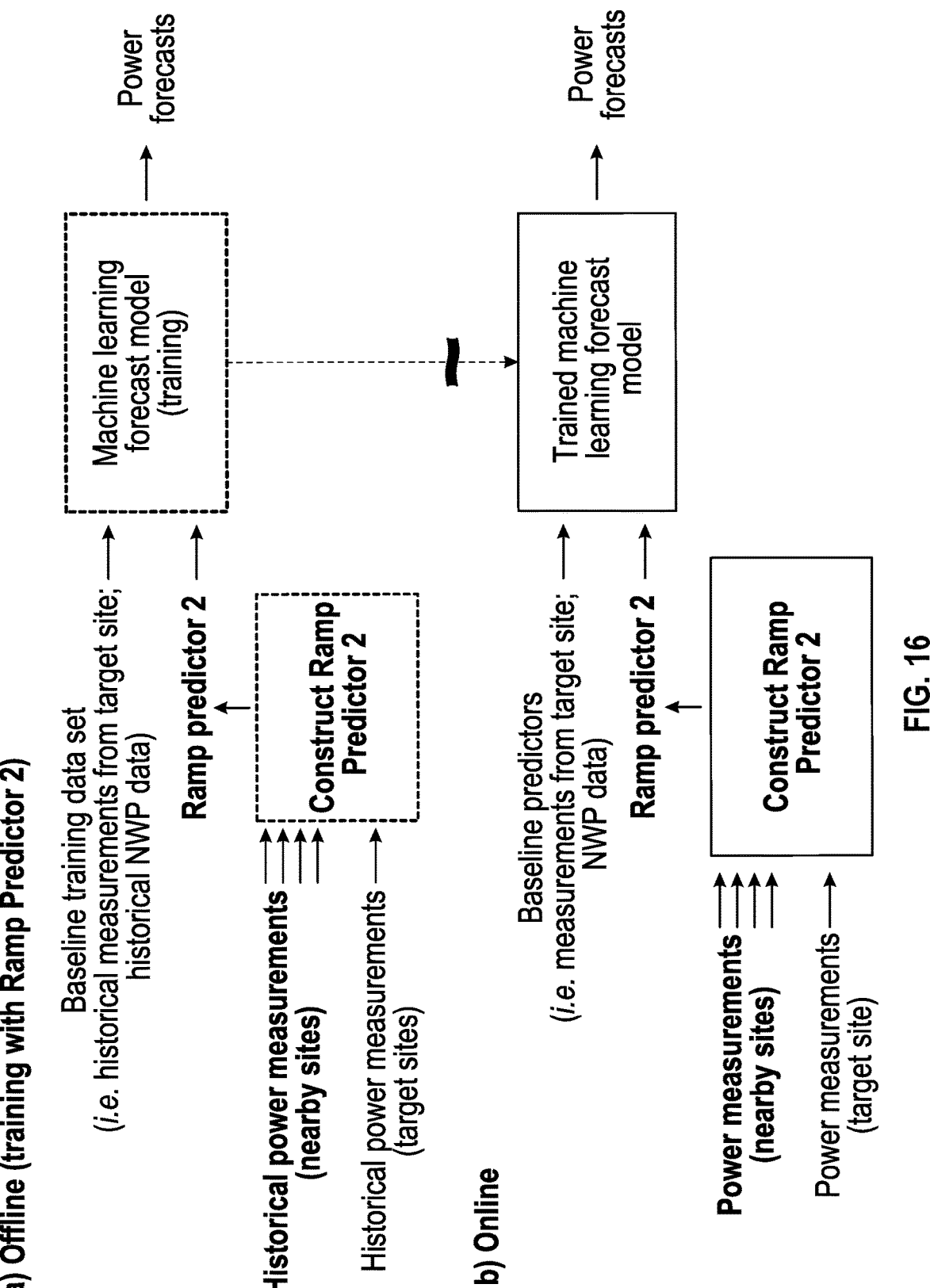
FIG. 16 depicts an example of offline training and online operation of a forecast model with RP2 predictors as an added predictor in some embodiments.

FIG. 16 depicts an example of offline training and online operation of a forecast model with RP2 predictors as an added predictor in some embodiments. In offline (training with RP2 predictors), availability of historical data on power measurements from nearby sites and the target site enables construction of RP2 predictors during training of the forecast model. In online operation, power measurements from nearby neighboring sites and the target site enable construction of RP2 at time of forecast for online operation of the forecast model.

In one example, the ramp predictor generation module 1106 creates correlation matrices for each look-ahead time of the target farm with different time shifts of the nearby farms forecast error. The correlation may be carried out for each day of the training dataset and, in some embodiments, only the median values are shown in the matrices.

The ramp predictor generation module 1106 may extract the most correlated nearby farms along with the time-shifts of their highest correlated values (i.e., lags) for each look-ahead time of the target farm. In some embodiments, to be selected as a nearby farm, a farm must exceed a threshold for minimum correlation value and also fall within a certain range of the highest correlation value of all the farms. In various embodiments, the shorter the look-ahead time, the longer the selected optimum lag time. This is expected, since at time of forecast, smaller look-ahead times at the target farm may correlate maximally with conditions at the nearby farm that are farther in the past.

As discussed herein regarding the ramp predictors (RP1) (discussed with regard to FIGS. 3, 4, and 9), the RP1 predictors cannot be constructed until a set of forecasts has been generated by the forecast model. In contrast, measurements (e.g., all) for construction of RP2 predictors may be available at time of forecast, and RP2 may be constructed with no dependence on the forecast model. It can therefore be simply added to the predictors of an established forecast model as shown in FIG. 15 and FIG. 16.

In FIGS. 15 and 16, "Ramp Predictor 2" stands for the series of values, $R2_{\bar{n},k,l}$, constructed according to the rules described above, and it may also stand for an additional predictor, $C_{0:n}$, a continuous variable alerting the forecast model to the strength of the correlation which determines the predictive value of $R2_{\bar{n},k,l}$.

In various embodiments, the RP2 predictors may be constructed and utilized alongside RP1 predictors within any method discussed herein.

In various embodiments, RP1 predictors (described with regard to FIGS. 3 and 9) and RP2 predictors are formally identical, although there is a crucial difference in their construction. The power forecasts for construction of RP1 predictors are provided by a forecast model for the target site, while the power forecasts for construction of RP2 predictors are provided by power measurements from a nearby site. This difference means that the implementation of RP2 predictors differs from the implementation of RP1 predictors:

In various embodiments, $R1_{k,l}$ (RP1 predictors) can be constructed for a given look-ahead time, l, limited only by the capability of a chosen forecast model to generate forecasts for long lookahead times. In contrast, in some embodiments, $R2_{\bar{n},k,l}$(RP2 predictors) can be constructed only for look-ahead times satisfying equation 7, and since $\tau_{0:n}$ is time dependent, equation 7 may or may not be satisfied at time of forecast for a desired look-ahead time. $R2_{\bar{n},k,l}$ may or may not be available at time of forecast as a predictor for the forecast application. Therefore, in some embodiments, training a forecast application with $R2_{\bar{n},k,l}$ may require a larger historical data set than does training of $R1_{k,l}$ The predictive value of $R2_{\bar{n},k,l}$ may vary in time with changes in the strength of the correlation between nearby site and target site. To alert the forecast application to this time dependence, the correlation coefficient, $C_{0:n}$, can be fed to the forecast application as a continuous variable along with $R2_{\bar{n},k,l}$. Alternatively, or in addition, a threshold value of $C_{0:n}$ can be set, below which $R2_{\bar{n},k,l}$ will not be constructed. The optimum value for this threshold, Cmin(l), is determined empirically.

Figure 17:
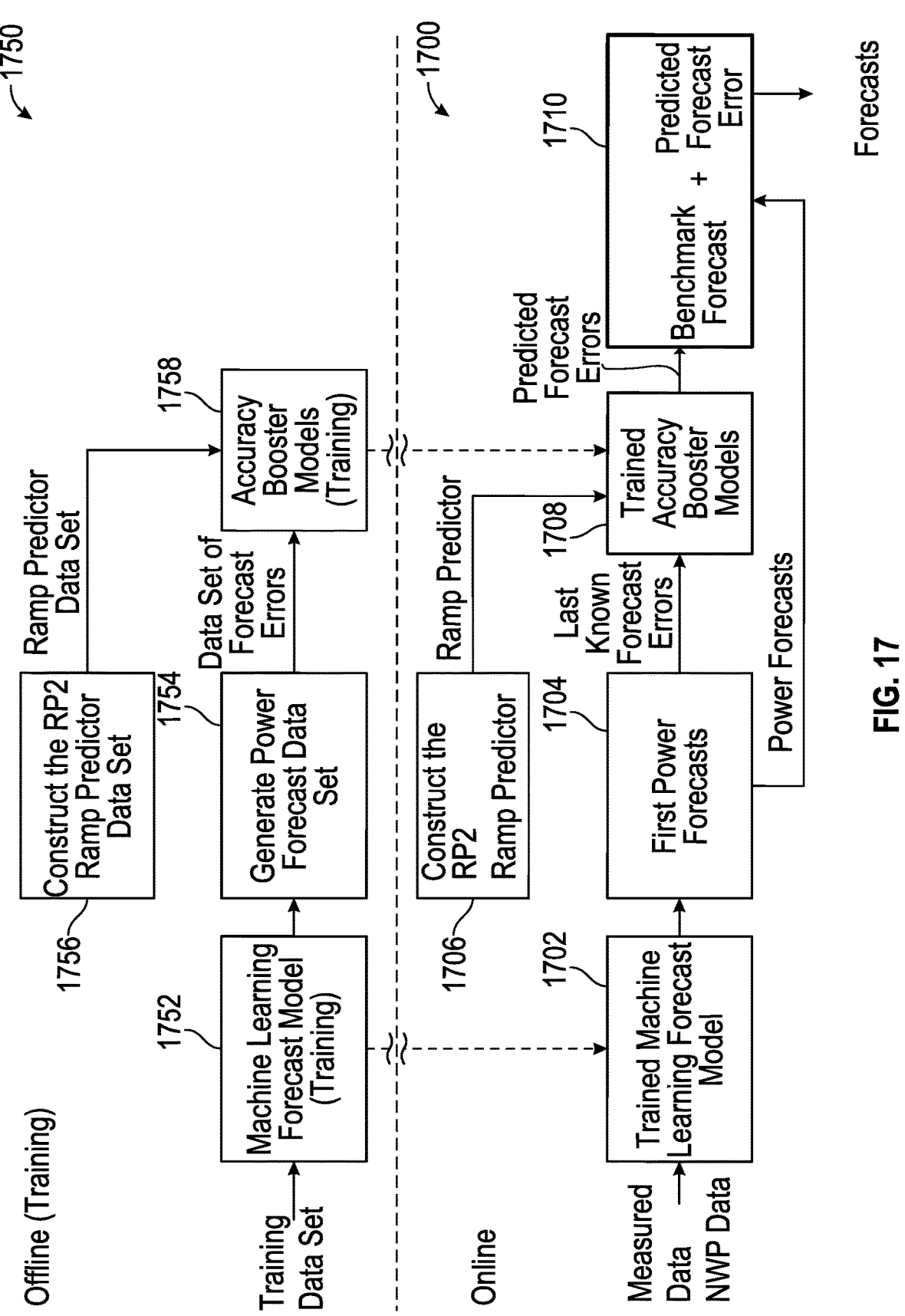
FIG. 17 depicts a method for online forecasting using trained accuracy booster models and a method for offline training of the accuracy booster models in some embodiments.

FIG. 17 depicts a method 1700 for online forecasting using trained accuracy booster models and a method 1750 for offline training of the accuracy booster models in some embodiments. FIG. 17 is similar to FIG. 3, however FIG. 3 is directed to utilizing ramp predictors RP1 while FIG. 17 is directed to utilizing RP2 predictors.

In various embodiments, the variable power generation forecast system 1100 performs the method 1700. The method 1700 for online forecasting using the trained accuracy booster models begins at a block 1702 where the power forecasting module 1110 receives data, which includes generated power measurements for one or more of the variable power generation assets 112, weather forecast data (for example, Numerical Weather Prediction (NWP) data) for a geographic area that includes the one or more of the variable power generation assets 112, and may include additional data and/or metadata for the one or more variable power generation assets 112 (for example, wind turbine capacity rating). The generated power measurements may include a last generated power measurement that may have been measured generally at or just prior to a time the power forecasting module 1110 generates power forecasts. The generated power measurements may also include one or more generated power measurements prior to the last generated power measurement. The last generated power measurement is referred to herein as a reference generated power measurement.

Also at the block 1702, the power forecasting module 1110 applies a trained machine learning forecast model to all or a portion of the received data to obtain first power forecasts for a set of look-ahead times for the one or more variable power generation assets. The set of look-ahead times may include look-ahead times from approximately 10 minutes from a time of forecast to approximately six hours from the time of forecast. There may be look-ahead times within the set of look-ahead times every period of time (for example, every 10 minutes) or the period of time may vary (for example, may change from every 10 minutes to every 170 minutes). For example, the set of look-ahead times may include look-ahead times every 10 minutes from the time of forecast to six hours from the time of forecast. In some embodiments, a look-ahead time may occur every first period of time for a first subset of the set of look-ahead times and every second period of time for a second subset of the set of look-ahead times. For example, the set of look-ahead times may include look-ahead times every 10 minutes from the time of forecast up to three hours and 170 minutes from the time of forecast, and every 170 minutes from four hours from the time of forecast to six hours from the time of forecast. It will be appreciated that the set of look-ahead times may include any number of look-ahead times within a future period of time following the time of forecast.

In some embodiments, the power forecasting module 1110 may apply the trained machine learning forecast model to the generated power measurements and the weather forecast data to obtain a first subset of the first power forecasts for a first subset of the set of look-ahead times that are prior to or at a threshold look-ahead time. In such embodiments the power forecasting module 1110 may apply the trained machine learning forecast model to the weather forecast data, and not the generated power measurements, to obtain a second subset of the first power forecasts for a second subset of the set of look-ahead times that are after the threshold look-ahead time. For example, the power forecasting module 1110 may apply the trained machine learning forecast model to the generated power measurements and the weather forecast data to obtain the first subset of the first set of power forecasts for look-ahead times that are from approximately 10 minutes, inclusive, to a threshold look-ahead time of approximately three hours and 170 minutes, inclusive. Furthermore, the power forecasting module 1110 may apply the trained machine learning forecast model to the weather forecast data, and not the generated power measurements, to obtain the second subset of the first power forecasts for look-ahead times that are after the threshold look-ahead time of approximately three hours and 170 minutes to six hours, inclusive. The use of only weather forecast data for look-ahead times after approximately three hours and 170 minutes may result a reduction in accuracy of the first power forecasts but may also require fewer computational resources to train the machine learning forecast model and to apply the trained machine learning forecast model.

At a block 1704, the forecast error calculation module 1112 calculates power forecast errors based on the previously generated power measurements and the previous power forecasts. The forecast error calculation module 1112 calculates power forecast errors by subtracting previously generated power measurements from previous power forecasts. The forecast error calculation module 1112 calculates a power forecast error $$P^e_{k,l}$$

for a particular look-ahead time l at timestamp k by subtracting the generated power measurement $$P^m_k$$

from the power forecast $$P^f_{k,l}$$

as discussed with regard to FIG. 3.

The forecast error calculation module 1112 provides the power forecast errors to the forecast error prediction module 1114 at block 1708, described in more detail herein.

At block 1706, the ramp predictor generation module 1106 generates RP2 ramp predictors for the set of look-ahead times (as discussed with regard to FIGS. 13 and 14). The ramp predictor generation module 1106 generates one ramp predictor for each look-ahead time of the set of look-ahead times. The RP2 ramp predictor set may be based on any number of neighboring sites to the target site or any or all of the set of look-ahead times.

At the block 1708, the forecast error prediction module 1114 receives the power forecast errors that the forecast error calculation module 1112 calculated at the block 1704 and the ramp predictors RP2 that the ramp predictor generation module 1106 generated at the block 1706. The forecast error prediction module 1114 applies the trained accuracy booster models to the ramp predictors and the power forecast errors to obtain predicted forecast errors. In some embodiments, each of the trained accuracy booster models is a set of trained decision trees. The training of the decision trees is discussed with reference to, for example, the method 1750.

At a block 1710, the power forecasting module 1110 generates second power forecasts for the set of look-ahead times based on the first power forecasts and the predicted forecast errors. In some embodiments, the power forecasting module 1110 adds the power forecasts and the predicted forecast errors to obtain the second power forecasts for the set of look-ahead times. That is, to obtain a second power forecast $$P^i_{k,l}$$

for a look-ahead time l at timestamp k the power forecasting module 1110 adds the predicted forecast error $$\hat{P}^e_{k,l}$$

to the first power forecast $$P^f_{k,l}$$

as discussed regarding FIG. 3.

After generating the second power forecasts, the notification module 1116 may generate notifications including the second power forecasts, and the communication module 1102 may provide the second power forecasts to the operations system 120 for display, further processing, and/or analysis. Additionally or alternatively, the communication module 1102 may provide the second power forecasts to the power system 106 so that the power system 106 may use the second power forecasts in balancing load and generation.

The variable power generation forecast system 1100 may perform the method 1700 periodically, such as every 10 minutes, to generate the second power forecasts for the one or more of the variable power generation assets 112.

FIG. 17 also depicts the method 1750 for offline training of the accuracy booster models. The variable power generation forecast system 1100 performs the method 1750. The method 1750 begins at a block 1752 where the training and curation module 1108 receives a training data set for use in training a machine learning forecast model that forecasts power generated by the variable power generation assets 112. The training data set may include historical power measurements of power generated by the variable power generation assets 112, metadata for the variable power generation assets 112 (for example, wind turbine capacity rating), and/or historical weather data. The communication module 1102 may have previously received data in the training data set and stored the training data set in the data storage 1120. The training and curation module 1108 may receive the training data set from the data storage 1120. The training and curation module 1108 uses the training data set to train the machine learning forecast model.

In various embodiments, the machine learning forecast model may be or include one or more various machine learning and/or artificial intelligence (AI) architectures, such as support vector machines, feed-forward neural networks, recurrent neural networks such as long short-term memory networks, decision trees, and/or the like. In various embodiments, in addition to or as an alternative to a machine learning forecast model, one or more statistical models may be utilized (for example, auto-regressive integrated moving average, auto-regressive moving average, coupled auto-regressive and dynamic systems, and Markov models).

At a block 1754, the data set generation module 1104 generates a power forecast data set. The data set generation module 1104 may use the trained machine learning forecast model to generate the power forecast data set. The power forecast data set may be for a historical period of time (for example, one year) for which actual power measurements of the variable power generation assets 112 are available. Also at the block 1754 the data set generation module 1104 generates a power forecast error data set. The data set generation module 1104 may generate the power forecast error data set based on the power forecast data set and actual power measurements. For example, the data set generation module 1104 may subtract the actual power measurements from the power forecasts (or vice-versa) to obtain their differences, which are the power forecast errors. The data set generation module 1104 may use the power forecast errors to generate the power forecast error data set.

At a block 1756 the data set generation module 1104 generates an RP2 ramp predictor data set. The data set generation module 1104 may generate the RP2 ramp predictor data set as discussed with regard to FIGS. 13 and 14. The RP2 ramp predictor set may be based on any number of neighboring sites to the target site.

At a block 1758, the training and curation module 1108 trains the accuracy booster models. In some embodiments, the each of the accuracy booster models is a set of decision trees. In some embodiments, the training and curation module 1108 utilizes a Python XGBoost library to train the decision trees. In some embodiments, the training and curation module 1108 generates a set of decision trees for each look-ahead time. The following table displays the hyper-parameters and their values that the training and curation module 1108 uses to train each set of decision trees:

| Hyperparameter | Value |
| --- | --- |
| n estimators | 1000 |
| max depth | 5 |
| learning rate | 0.01 |
| subsample | 1 |
| colsample_bytree | 0.8 |

In various embodiments, one or more machine learning and/or artificial intelligence (AI) architectures may be utilized (for example, support vector machines, feed-forward neural networks, recurrent neural networks such as long short-term memory networks, and/or the like) in addition to or as an alternative to the sets of decision trees discussed herein. In various embodiments, one or more statistical models may be utilized (for example, auto-regressive integrated moving average, auto-regressive moving average, coupled auto-regressive and dynamic systems, and Markov models) in addition to or as an alternative to the sets of decision trees discussed herein. The one or more machine learning and/or AI architectures and/or statistical models may utilize the features discussed herein to generate forecast models and/or make forecasts.

Forecasting power generation from intermittent sources of energy involves gathering and analyzing data from diverse sources which can be categorized in two broad classes, measurement data, and numerical weather prediction data.

Measurement data may include measurements of power generation at a site, but may also include measurements from specialized instruments. For example, measurements for wind power forecasting might include wind speed and direction at various heights above ground, from which model of turbine operation might infer available power. Measurements for solar power forecasting might include ground-based sky observations. for solar power forecasting. The time series of such measurements can be analyzed by statistical methods to produce a short-term forecast based on the likely persistence of trends evident at the time of forecast.

Numerical weather prediction (NWP) models provide estimates of the time-evolution of weather variables important for longer-term forecasts. Because these models are very compute-intensive and cover large geographic areas, they are typically run by national authorities at regular intervals a few times a day. The computed weather variables from one or more of these regional weather models become input data (predictors) for a local forecast model.

The most accurate power generation forecasts employ statistical models which leverage both the short-term persistence of past measurements as well as data from longer-term weather prediction. Such statistical models include machine learning models such as neural networks. The accuracy of short-term forecasts (minutes to a few hours) is largely dependent on measurement data. As the forecast look-ahead time is made longer, measurement data loses its value and forecast accuracy is increasingly determined by NWP data. For forecasts beyond some threshold look-ahead time, measurement data is not used. These longer-term power forecast models are sometimes referred to as "weather only" models.

Figure 18:
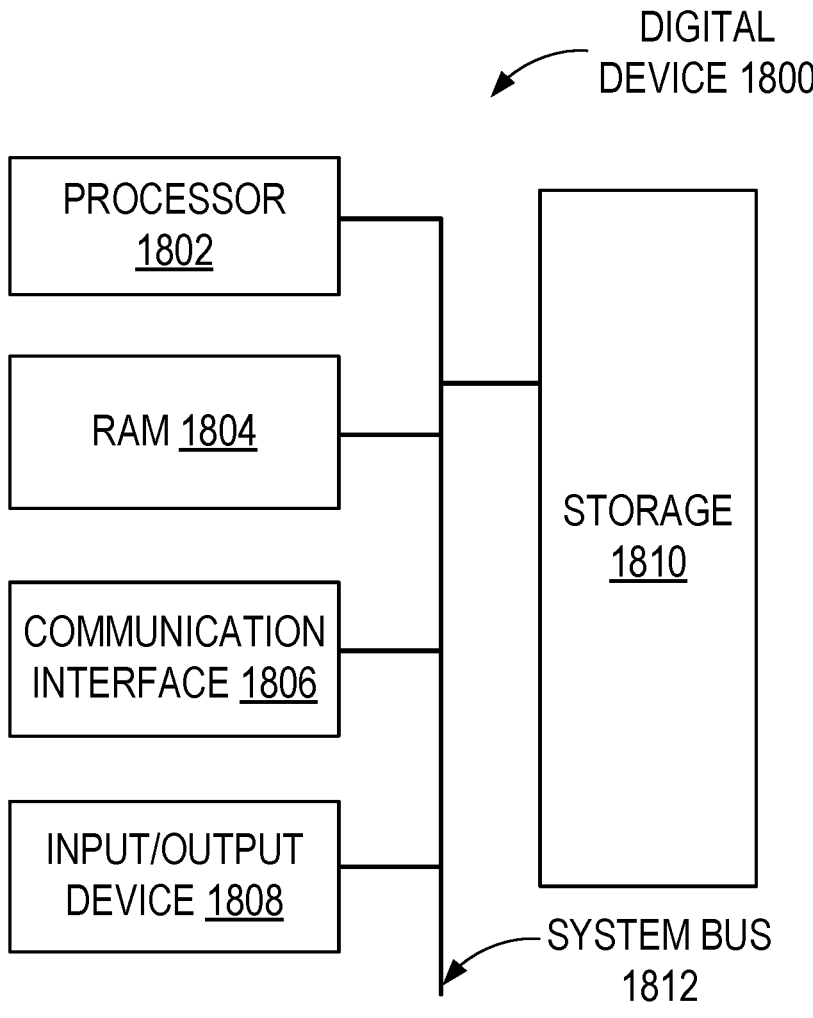
FIG. 18 depicts a block diagram of an example digital device in some embodiments.

FIG. 18 depicts a block diagram of an example digital device 1800 according to some embodiments. The digital device 1800 is shown in the form of a general-purpose computing device. The digital device 1800 includes at least one processor 1802, RAM 1804, communication interface 1806, input/output device 1808, storage 1810, and a system bus 1812 that couples various system components including storage 1810 to the at least one processor 1802. A system, such as a computing system, may be or include one or more of the digital device 1800.

System bus 1812 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The digital device 1800 typically includes a variety of computer system readable media, such as computer system readable storage media. Such media may be any available media that is accessible by any of the systems described herein and it includes both volatile and nonvolatile media, removable and non-removable media.

In some embodiments, the at least one processor 1802 is configured to execute executable instructions (for example, programs). In some embodiments, the at least one processor 1802 comprises circuitry or any processor capable of processing the executable instructions.

In some embodiments, RAM 1804 stores programs and/or data. In various embodiments, working data is stored within RAM 1804. The data within RAM 1804 may be cleared or ultimately transferred to storage 1810, such as prior to reset and/or powering down the digital device 1800.

In some embodiments, the digital device 1800 is coupled to a network via communication interface 1806. Still yet, the electrical network 102, the variable power generation forecast system 104, the power system 106 and/or the operations system 120 can communicate with one or more networks such as a local area network (LAN), a general wide area network (WAN), and/or a public network (for example, the Internet).

In some embodiments, input/output device 1808 is any device that inputs data (for example, mouse, keyboard, stylus, sensors, etc.) or outputs data (for example, speaker, display, virtual reality headset).

In some embodiments, storage 1810 can include computer system readable media in the form of non-volatile memory, such as read only memory (ROM), programmable read only memory (PROM), solid-state drives (SSD), flash memory, and/or cache memory. Storage 1810 may further include other removable/non-removable, volatile/non-volatile computer system storage media. By way of example only, storage 1810 can be provided for reading from and writing to a non-removable, non-volatile magnetic media. The storage 1810 may include a non-transitory computer-readable medium, or multiple non-transitory computer-readable media, which stores programs or applications for performing functions such as those described herein with reference to, for example, FIG. 2. Although not shown, a magnetic disk drive for reading from and writing to a removable, non-volatile magnetic disk (for example, a "floppy disk"), and an optical disk drive for reading from or writing to a removable, non-volatile optical disk such as a CDROM, DVD-ROM or other optical media can be provided. In such instances, each can be connected to system bus 1812 by one or more data media interfaces. As will be further depicted and described below, storage 1810 may include at least one program product having a set (for example, at least one) of program modules that are configured to carry out the functions of embodiments of the invention. In some embodiments, RAM 1804 is found within storage 1810.

Programs/utilities, having a set (at least one) of program modules, such as the variable power generation forecast system 104, may be stored in storage 1810 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

It should be understood that although not shown, other hardware and/or software components could be used in conjunction with the digital device 1800. Examples include, but are not limited to microcode, device drivers, redundant processing units, and external disk drive arrays, RAID systems, tape drives, and data archival storage systems, etc.

Exemplary embodiments are described herein in detail with reference to the accompanying drawings. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated, aspects of one or more embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a solid state drive (SSD), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program or data for use by or in connection with an instruction execution system, apparatus, or device.

A transitory computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++, Python, or the like and conventional procedural programming languages, such as the "C" programming language or similar programming languages. The computer program code may execute entirely on any of the systems described herein or on any combination of the systems described herein.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While specific examples are described above for illustrative purposes, various equivalent modifications are possible, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented concurrently or in parallel or may be performed at different times. Further any specific numbers noted herein are only examples: alternative implementations may employ differing values or ranges.

Throughout this specification, plural instances may implement components, operations, or structures described as a single instance. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. Furthermore, any specific numbers noted herein are only examples: alternative implementations may employ differing values or ranges.

Components may be described or illustrated as contained within or connected with other components. Such descriptions or illustrations are examples only, and other configurations may achieve the same or similar functionality. Components may be described or illustrated as "coupled", "couplable", "operably coupled", "communicably coupled" and the like to other components. Such description or illustration should be understood as indicating that such components may cooperate or interact with each other, and may be in direct or indirect physical, electrical, or communicative contact with each other.

Components may be described or illustrated as "configured to", "adapted to", "operative to", "configurable to", "adaptable to", "operable to" and the like. Such description or illustration should be understood to encompass components both in an active state and in an inactive or standby state unless required otherwise by context.

It may be apparent that various modifications may be made, and other embodiments may be used without departing from the broader scope of the discussion herein. Therefore, these and other variations upon the example embodiments are intended to be covered by the disclosure herein.

The invention claimed is:

1. A non-transitory computer-readable medium comprising executable instructions, the executable instructions being executable by one or more processors to perform a method, the method comprising:

receiving, from sensors at a target renewable energy site and a first nearby site, real-time power measurements from variable power generation assets;

at a weather forecast time, determining, by the one or more processors, a lag between the target renewable energy site and the first nearby site for which respective power measurements are correlated;

selecting, by the one or more processors, a first forecast look-ahead time;

determining, by the one or more processors, if the first forecast look-ahead time is less than or equal to the lag between the target renewable energy site and the first nearby site for which the respective power measurements are correlated;

determining, by the one or more processors, a series of lagged power measurements at a time of forecast which constitute a series of correlation-based forecasts for power generation at the target renewable energy site, the series of lagged power measurements being based at least in part on the lag between the target renewable energy site and the first nearby site;

generating, by the one or more processors, a set of ramp predictors incorporating correlation-based forecasts from the first nearby site for the time of forecast and the first forecast look-ahead time based on the series of lagged power measurements, the series of lagged power measurements being based at least in part on the lag between the target renewable energy site and the first nearby site, each ramp predictor of the set of ramp predictors including a difference between measured power at a time index and a measured power at a current timestamp;

receiving power forecast errors for one or more variable power generation assets of the target renewable energy site;

applying, by the one or more processors, sets of decision trees to one or more of the ramp predictors of the set of ramp predictors and the power forecast errors to obtain predicted forecast errors;

generating, by one or more processors, second power forecasts for a set of look-ahead times for one or more variable power generation assets of the target renewable energy site based on first power forecasts and the predicted forecast errors;

transmitting the second power forecasts to a power system; and balancing load and generation in an electrical network based on the transmitted second power forecasts, wherein the electrical network comprises the target renewable energy site.

2. The non-transitory computer-readable medium of claim 1, wherein, at the weather forecast time, determining the lag between the target renewable energy site and the first nearby site for which the respective power measurements are correlated, comprises at the weather forecast time, determining the lag between the target renewable energy site and the first nearby site for which the respective power measurements are maximally correlated with a first correlation coefficient of the target renewable energy site and the first nearby site that is dependent on time.

3. The non-transitory computer-readable medium of claim 2, wherein the first correlation coefficient of the target renewable energy site and the first nearby site changes over time based on weather conditions.

4. The non-transitory computer-readable medium of claim 1, wherein the first nearby site is a renewable energy site.

5. The non-transitory computer-readable medium of claim 1, wherein the series of lagged power measurements are determined if a first correlation coefficient of the target renewable energy site and the first nearby site is greater than a threshold value, the first correlation coefficient indicating a strength of the correlation between the first nearby site and the target renewable energy site.

6. The non-transitory computer-readable medium of claim 1, wherein the measured power is correlation-based forecast power.

7. The non-transitory computer-readable medium of claim 1, wherein the series of lagged power measurements are determined if the first forecast look-ahead time is less than or equal to the lag between the target renewable energy site and the first nearby site for which the respective power measurements are correlated.

8. The non-transitory computer-readable medium of claim 1, the method further comprising:

at the weather forecast time, determining a lag between the target renewable energy site and a second nearby site for which respective power measurements are correlated;

determining if the first forecast look-ahead time is less than or equal to the lag between the target renewable energy site and the second nearby site for which the respective power measurements are correlated;

generating a series of lagged power measurements at the time of forecast which constitute a series of correlation-based forecasts for power generation at the target renewable energy site, the series of lagged power measurements being based at least in part on the lag between the target renewable energy site and the second nearby site; and determining a set of ramp predictors incorporating correlation-based forecasts from the first nearby site for the time of forecast and the first forecast look-ahead time based on the series of lagged power measurements, the series of lagged power measurements being based at least in part on the lag between the target renewable energy site and the second nearby site, each ramp predictor of the set of ramp predictors including a difference between measured power at a time index and a measured power at a current timestamp.

9. The non-transitory computer-readable medium of claim 8, wherein applying the sets of decision trees to one or more of the ramp predictors of the set of ramp predictors and the power forecast errors to obtain the predicted forecast errors comprises:

selecting at least one of the one of more of the ramp predictors of the set of ramp predictors with a most positive correlation coefficient relative to others of the set of ramp predictors; and applying the sets of decision trees to the at least one of the one or more of the ramp predictors of the set of ramp predictors.

10. A system comprising at least one processor and memory containing instructions, the instructions being executable by the at least one processor to:

receive, from sensors at a target renewable energy site and a first nearby site, real-time power measurements from variable power generation assets;

at a weather forecast time, determine, by one or more processors, a lag between the target renewable energy site and the first nearby site for which respective power measurements are correlated;

select, by one or more processors, a first forecast look-ahead time;

determine, by one or more processors, if the first forecast look-ahead time is less than or equal to the lag between the target renewable energy site and the first nearby site for which the respective power measurements are correlated;

determine, by one or more processors, a series of lagged power measurements at a time of forecast which constitute a series of correlation-based forecasts for power generation at the target renewable energy site, the series of lagged power measurements being based at least in part on the lag between the target renewable energy site and the first nearby site;

generate, by one or more processors, a set of ramp predictors incorporating correlation-based forecasts from the first nearby site for the time of forecast and the first forecast look-ahead time based on the series of lagged power measurements, the series of lagged power measurements being based at least in part on the lag between the target renewable energy site and the first nearby site, each ramp predictor of the set of ramp predictors including a difference between measured power at a time index and a measured power at a current timestamp;

receive power forecast errors for one or more variable power generation assets of the target renewable energy site;

apply, by one or more processors, sets of decision trees to one or more of the ramp predictors of the set of ramp predictors and the power forecast errors to obtain predicted forecast errors;

generate, by one or more processors, second power forecasts for a set of look-ahead times for one or more variable power generation assets of the target renewable energy site based on first power forecasts and the predicted forecast errors;

transmit the second power forecasts to a power system; and balancing load and generation in an electrical network based on the transmitted second power forecasts, wherein the electrical network comprises the target renewable energy site.

11. The system of claim 10, wherein, at the weather forecast time, determine the lag between the target renewable energy site and the first nearby site for which the respective power measurements are correlated, comprises at the weather forecast time, determine the lag between the target renewable energy site and the first nearby site for which the respective power measurements are maximally correlated with a first correlation coefficient of the target renewable energy site and the first nearby site that is dependent on time.

12. The system of claim 11, wherein the first correlation coefficient of the target renewable energy site and the first nearby site changes over time based on weather conditions.

13. The system of claim 10, wherein the first nearby site is a renewable energy site.

14. The system of claim 10, wherein the series of lagged power measurements are determined if a first correlation coefficient of the target renewable energy site and the first nearby site is greater than a threshold value, the first correlation coefficient indicating a strength of the correlation between the first nearby site and the target renewable energy site.

15. The system of claim 10, wherein the measured power is correlation-based forecast power.

16. The system of claim 10, wherein the series of lagged power measurements are determined if the first forecast look-ahead time is less than or equal to the lag between the target renewable energy site and the first nearby site for which the respective power measurements are correlated.

17. The system of claim 10, further comprising:

at the weather forecast time, determine a lag between the target renewable energy site and a second nearby site for which respective power measurements are correlated;

determine if the first forecast look-ahead time is less than or equal to the lag between the target renewable energy site and the second nearby site for which the respective power measurements are correlated;

determine a series of lagged power measurements at the time of forecast which constitute a series of correlation-based forecasts for power generation at the target renewable energy site, the series of lagged power measurements being based at least in part on the lag between the target renewable energy site and the second nearby site; and generate a set of ramp predictors incorporating correlation-based forecasts from the first nearby site for the time of forecast and the first forecast look-ahead time based on the series of lagged power measurements, the series of lagged power measurements being based at least in part on the lag between the target renewable energy site and the second nearby site, each ramp predictor of the set of ramp predictors including a difference between measured power at a time index and a measured power at a current timestamp.

18. The system of claim 17, wherein apply the sets of decision trees to one or more of the ramp predictors of the set of ramp predictors and the power forecast errors to obtain the predicted forecast errors comprises:

select at least one of the one of more of the ramp predictors of the set of ramp predictors with a most positive correlation coefficient relative to others of the set of ramp predictors; and apply the sets of decision trees to the at least one of the one or more of the ramp predictors of the set of ramp predictors.

19. A method comprising:

receiving, from sensors at a target renewable energy site and a first nearby site, real-time power measurements from variable power generation assets;

at a weather forecast time, determining a lag between the target renewable energy site and the first nearby site for which respective power measurements are correlated;

selecting, by one or more processors, a first forecast look-ahead time;

determining, by the one or more processors, if the first forecast look-ahead time is less than or equal to the lag between the target renewable energy site and the first nearby site for which the respective power measurements are correlated;

determining, by the one or more processors, a series of lagged power measurements at a time of forecast which constitute a series of correlation-based forecasts for power generation at the target renewable energy site, the series of lagged power measurements being based at least in part on the lag between the target renewable energy site and the first nearby site;

generating, by the one or more processors, a set of ramp predictors incorporating correlation-based forecasts from the first site for the time of forecast and the first forecast look-ahead time based on the series of lagged power measurements, the series of lagged power measurements being based at least in part on the lag between the target renewable energy site and the first nearby site, each of the set of ramp predictors including a difference between measured power at a time index and a measured power at a current timestamp;

receiving power forecast errors for one or more variable power generation assets of the target renewable energy site;

applying, by the one or more processors, sets of decision trees to one or more of the ramp predictors of the set of ramp predictors and the power forecast errors to obtain predicted forecast errors;

generating, by the one or more processors, second power forecasts for a set of look-ahead times for one or more variable power generation assets of the target renewable energy site based on first power forecasts and the predicted forecast errors;

transmitting the second power forecasts to a power system; and balancing load and generation in an electrical network based on the transmitted second power forecasts, wherein the electrical network comprises the target renewable energy site.

* * * * *